United States Patent
Bathla et al.

(10) Patent No.: US 11,979,473 B2
(45) Date of Patent: May 7, 2024

(54) CLOUD ACCESS SECURITY BROKER SYSTEMS AND METHODS WITH AN IN-MEMORY DATA STORE

(71) Applicant: Zscaler, Inc., San Jose, CA (US)

(72) Inventors: Abhishek Bathla, Panipat (IN); Kumar Gaurav, Cupertino, CA (US); Raman Madaan, Bengaluru (IN); Chakkaravarthy Periyasamy Balaiah, Sunnyvale, CA (US); Shweta Gupta, Chandigarh (IN)

(73) Assignee: Zscaler, Inc., San Jose, CA (US)

(*) Notice: Subject to any disclaimer, the term of this patent is extended or adjusted under 35 U.S.C. 154(b) by 0 days.

(21) Appl. No.: 18/122,354

(22) Filed: Mar. 16, 2023

(65) Prior Publication Data
US 2023/0224377 A1 Jul. 13, 2023

Related U.S. Application Data

(63) Continuation of application No. 17/061,704, filed on Oct. 2, 2020, now Pat. No. 11,637,910.

(30) Foreign Application Priority Data

Aug. 20, 2020 (IN) .............................. 202011035829

(51) Int. Cl.
*H04L 67/562* (2022.01)
*G06F 21/55* (2013.01)
*G06F 21/56* (2013.01)
*H04L 9/40* (2022.01)
*H04L 67/1095* (2022.01)
*H04L 67/563* (2022.01)

(52) U.S. Cl.
CPC .......... *H04L 67/562* (2022.05); *G06F 21/552* (2013.01); *G06F 21/568* (2013.01); *H04L 63/145* (2013.01); *H04L 67/1095* (2013.01); *H04L 67/563* (2022.05)

(58) Field of Classification Search
CPC . H04L 67/562; H04L 63/145; H04L 67/1095; H04L 67/563; H04L 63/1416; H04L 67/1097; G06F 21/552; G06F 21/568
See application file for complete search history.

(56) References Cited

U.S. PATENT DOCUMENTS

| | | |
|---|---|---|
| 8,185,510 B2 | 5/2012 | Chaudhry et al. |
| 8,429,111 B1 | 4/2013 | Kailash et al. |
| 8,869,259 B1 | 10/2014 | Udupa et al. |

(Continued)

*Primary Examiner* — El Hadji M Sall
(74) *Attorney, Agent, or Firm* — Baratta Law PLLC; Lawrence A. Baratta, Jr.

(57) ABSTRACT

A method performed by a Cloud Access Security Broker (CASB) service includes scanning data stored in one of a cloud provider and a Software-as-a-Service (SaaS) application, wherein the data is for a user associated with a company of a plurality of companies; detecting an incident in a file or email in the data during the scanning; maintaining details of the incident in an in-memory data store, including a current snapshot of the file or email; and providing a notification to the tenant of the incident. The method can further include, subsequent to the incident and while the file or email is being updated, updating the details of the incident in the in-memory data store.

20 Claims, 16 Drawing Sheets

(56) References Cited

U.S. PATENT DOCUMENTS

| | | |
|---|---|---|
| 8,887,249 B1 | 11/2014 | Schekochikhin et al. |
| 9,152,789 B2 | 10/2015 | Natarajan et al. |
| 9,154,475 B1 | 10/2015 | Kailash et al. |
| 9,473,537 B2 | 10/2016 | Sinha et al. |
| 9,609,015 B2 | 3/2017 | Natarajan et al. |
| 10,523,710 B2 | 12/2019 | Sinha et al. |
| 10,621,346 B1 | 4/2020 | Singh et al. |
| 10,812,531 B2 | 10/2020 | Narayanaswamy et al. |
| 10,873,644 B1 | 12/2020 | Rappaport et al. |
| 10,979,452 B2 | 4/2021 | Kundu et al. |
| 2017/0295197 A1 | 10/2017 | Parimi et al. |
| 2018/0027006 A1 | 1/2018 | Zimmermann et al. |
| 2018/0097832 A1 | 4/2018 | Viktorov |
| 2018/0375886 A1 | 12/2018 | Kirti et al. |
| 2019/0007394 A1* | 1/2019 | Patel .................. G06F 21/44 |
| 2019/0007438 A1* | 1/2019 | Viktorov ............. H04L 63/20 |
| 2019/0020667 A1 | 1/2019 | Parker et al. |
| 2019/0068627 A1 | 2/2019 | Thampy |
| 2019/0095320 A1 | 3/2019 | Biswas et al. |
| 2019/0098037 A1 | 3/2019 | Shenoy, Jr. et al. |
| 2019/0297161 A1 | 9/2019 | Ayyadevara et al. |
| 2019/0318100 A1 | 10/2019 | Bhatia et al. |
| 2020/0128047 A1 | 4/2020 | Biswas et al. |
| 2020/0336484 A1 | 10/2020 | Mahajan et al. |
| 2020/0336503 A1 | 10/2020 | Xu et al. |
| 2021/0044603 A1* | 2/2021 | Annen ................ G06N 20/00 |
| 2021/0044604 A1* | 2/2021 | Annen ................ G06F 21/565 |
| 2021/0150056 A1 | 5/2021 | Vax et al. |
| 2021/0250333 A1 | 8/2021 | Negrea et al. |

\* cited by examiner

CLOUD ACCESS SECURITY BROKER SYSTEMS AND METHODS WITH AN IN-MEMORY DATA STORE

FIELD OF THE DISCLOSURE

The present disclosure relates generally to networking and computing. More particularly, the present disclosure relates to Cloud Access Security Broker (CASB) systems and methods with an in-memory data store.

FIELD OF THE DISCLOSURE

The present disclosure relates generally to networking and computing. More particularly, the present disclosure relates to Cloud Access Security Broker (CASB) systems and methods with an in-memory data store.

BACKGROUND OF THE DISCLOSURE

Traditionally, before the cloud, corporate or enterprise resources were fully under the control of Information Technology (IT) administration ("admins"). That is, sensitive enterprise data was located within a network under IT admin control with perimeter defenses. Here, IT admins have full control of access privileges, activity, etc. As is well-known, enterprises are moving their IT infrastructure to the cloud for a variety of cloud services (Software-as-a-Service (SaaS)) for email (e.g., Office 365, Gmail, etc.), file storage (OneDrive, Dropbox, Box, Google Drive, SharePoint, etc.), document preparation and content collaboration (e.g., Office 365, Google Docs, etc.), Customer Relationship Management (CRM) (e.g., Salesforce, etc.), and the like. Here, enterprise IT admins no longer have the same level of control of enterprise resources, i.e., content is stored in the cloud, and IT simply does not have the same level of control as before.

A Cloud Access Security Broker (CASB) is an on-premises system or cloud-based service between cloud service users and cloud applications. The CASB is configured to monitor activity and enforce security policies, such as monitoring user activity, warning administrators about potentially hazardous actions, Data Loss Prevention (DLP), enforcing security policy compliance, automatically preventing malware, etc. For example, a CASB system, either on-premises or as a cloud-based service, can scan through a large number of files in a cloud or SaaS application, e.g., Office 365, Dropbox, Box, Google Drive, Salesforce, etc. This places tremendous loads on traditional CASB systems, resulting in latency, inability to properly scan all files, poor user experience, etc. In effect, an objective of a CASB system or scanner is to provide IT admin with control as if the enterprise resources were fully under the IT admin's control as before the cloud.

One particular problem for enterprises and their SaaS services is the so-called "shadow ID" problem. Here, enterprise users use their user ID/password for SaaS services when registering at third party sites. That is, users typically use their email (as user ID) and reuse passwords. As such, login credentials for the SaaS services may be compromised, leaving a hole in enterprise resource security. For enterprises, with users distributed geographically and with multiple SaaS applications, it is critical to provide CASB protection as soon as possible, namely scanning data and preventing data loss at near real-time is critical. In this context, there is a need to identify changes, active users, etc. and a need to load balance activity, all in an effort for near real-time scanning of SaaS applications.

A CASB system can operate through an Application Programming Interface (API) provided by a cloud or SaaS provider. The CASB system can include detection of DLP violations and/or malware in files, email, etc., which can be referred to as an incident. There is a need to capture information related to the incident for logging and reporting purposes in a scalable and efficient manner.

BRIEF SUMMARY OF THE DISCLOSURE

The present disclosure relates to Cloud Access Security Broker (CASB) systems and methods with an in-memory data store. This related to a CASB system performing scans to detect DLP violations and/or malware, with the resultant scan result referred to as an incident. The present disclosure provides logging and reporting for the incidents. The logging and reporting requirements for the incident reports are different from regular weblog and firewall logs where the previous transactions are immutable. For CASB incidents, a file in the cloud provider can be modified and rescanned again and again multiple times. IT from a company would like to see the current snapshot of the incidents and analyze the incident results. The present disclosure provides a highly scalable and efficient incident reporting approach for the latest snapshot for the scan (for each file and email).

Systems and methods include receiving a record associated with an incident that was detected by the CASB system in a Software-as-a-Service (SaaS) application; determining a hash based on a plurality of levels for the record; determining if the record exists in a data store based on the hash, and if the record exists, deleting an old record; and inserting the record in the data store based on the hash, wherein the data store is maintained in-memory and includes records at leaf nodes in a multi-level hash based on the plurality of levels. The incident can be one of a Data Loss Prevention (DLP) violation and malware, each being detected by a scan by the CASB system of the SaaS application. The CASB system can be a multi-tenant system, and wherein the plurality of levels include a company identifier, an application identifier for the SaaS application, and a tenant name for a user, each being individually hashed. The systems and methods can further include periodically storing records in the data store in a file for recovery. The systems and methods can further include receiving a query related to a count based on one or more of the plurality of levels; and responding to the query based on a count of the one or more of the plurality of levels. The systems and methods can further include broadcasting a delete request to other nodes in a cluster so that any node having a key based on the hash of each the plurality of levels deletes an old record. The systems and methods can further include receiving a delete request for a record where a query is running; and marking the record for deletion such that the record is deleted after the query.

Also, the present disclosure relates to Cloud Access Security Broker (CASB) systems and methods for active user identification and load balancing. In particular, the present disclosure describes an efficient CASB system that can perform distributed file crawling for a company (organization) to scan files for associated policies, take actions based on the associated policies, provide reports/control, and can integrate with cloud-based security systems. To achieve efficiency, the present disclosure includes detection of changes in data in a SaaS as soon as a user is active and modifies the data, and a scan of the data at a location closest to the source of the data, as well as scans in compliance with local law and regulations. The objective is to provide a company's IT administration control of files and other content stored in cloud applications. In an embodiment, the present disclosure utilizes Webhook integration in the CASB system to identify changes. In another embodiment, the present disclosure utilizes user geolocation for routing scans to a closest CASB scanner. The present disclosure is agnostic with respect to a cloud application, operating with various different cloud applications (SaaS) based on Application Programming Interfaces (APIs). Also, the present disclosure includes a so-called "assembly line" approach where various workers operate in parallel to efficiently process content through various queues, including various hand-offs. The CASB system described herein does not store customer data permanently, nor does it store confidential credentials, and the CASB system supports enormous scale (e.g., billions of files or more) along with a configured throttle rate by the cloud applications.

Systems and methods include causing a scan by Cloud Access Security Broker (CASB) system of a plurality of users associated with a company (organization) in a Software-as-a-Service (SaaS) application where the scan includes any of identifying malware in content in the SaaS application and identifying confidential data in the content in the SaaS application; during the scan which is covering historical data in the SaaS application, receiving notifications of the content being actively modified by any of the plurality of users; and including the content being actively modified in the scan with the historical data. The systems and methods can further include maintaining geolocation of the any of the plurality of users; and causing the content being actively modified in the scan to be processed by the CASB system based on the geolocation.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 is a block diagram of a server which may be used in the cloud-based system of FIG. 1, to implement a CASB system or the like;

FIG. 3 is a block diagram of a mobile device which may be used in the cloud-based system of FIG. 1 or the like;

DETAILED DESCRIPTION OF THE DISCLOSURE

Again, the present disclosure relates to Cloud Access Security Broker (CASB) systems and methods with an in-memory data store. This related to a CASB system performing scans to detect DLP violations and/or malware, with the resultant scan result referred to as an incident. The present disclosure provides logging and reporting for the incidents. The logging and reporting requirement for the incident reports are different from regular weblog and firewall logs where the previous transactions are immutable. For CASB incidents, a file in the cloud provider can be modified and rescanned again and again multiple times. A company would like to see the current snapshot of the incidents and analyze the incident results. The present disclosure provides a highly scalable and efficient incident reporting approach for the latest snapshot for the scan (for each file and email).

Also, the present disclosure relates to Cloud Access Security Broker (CASB) systems and methods for active user identification and load balancing. In particular, the present disclosure describes an efficient CASB system that can perform distributed file crawling for a company (organization) to scan files for associated policies, take actions based on the associated policies, provide reports/control, and can integrate with cloud-based security systems. To achieve efficiency, the present disclosure includes detection of changes in data in a SaaS as soon as a user is active and modifies the data, and a scan of the data at a location closest to the source of the data, as well as scans in compliance with local law and regulations. The objective is to provide a company's IT administration control of files and other content stored in cloud applications. In an embodiment, the present disclosure utilizes Webhook integration in the CASB system to identify changes. In another embodiment, the present disclosure utilizes user geolocation for routing scans to a closest CASB scanner. The present disclosure is agnostic with respect to a cloud application, operating with various different cloud applications (SaaS) based on Application Programming Interfaces (APIs). Also, the present disclosure includes a so-called "assembly line" approach where various workers operate in parallel to efficiently process content through various queues, including various hand-offs. The CASB system described herein does not store customer data permanently, nor does it store confidential credentials, and the CASB system supports enormous scale (e.g., billions of files or more) along with a configured throttle rate by the cloud applications.

Example Cloud-Based System Architecture

Figure 1A:
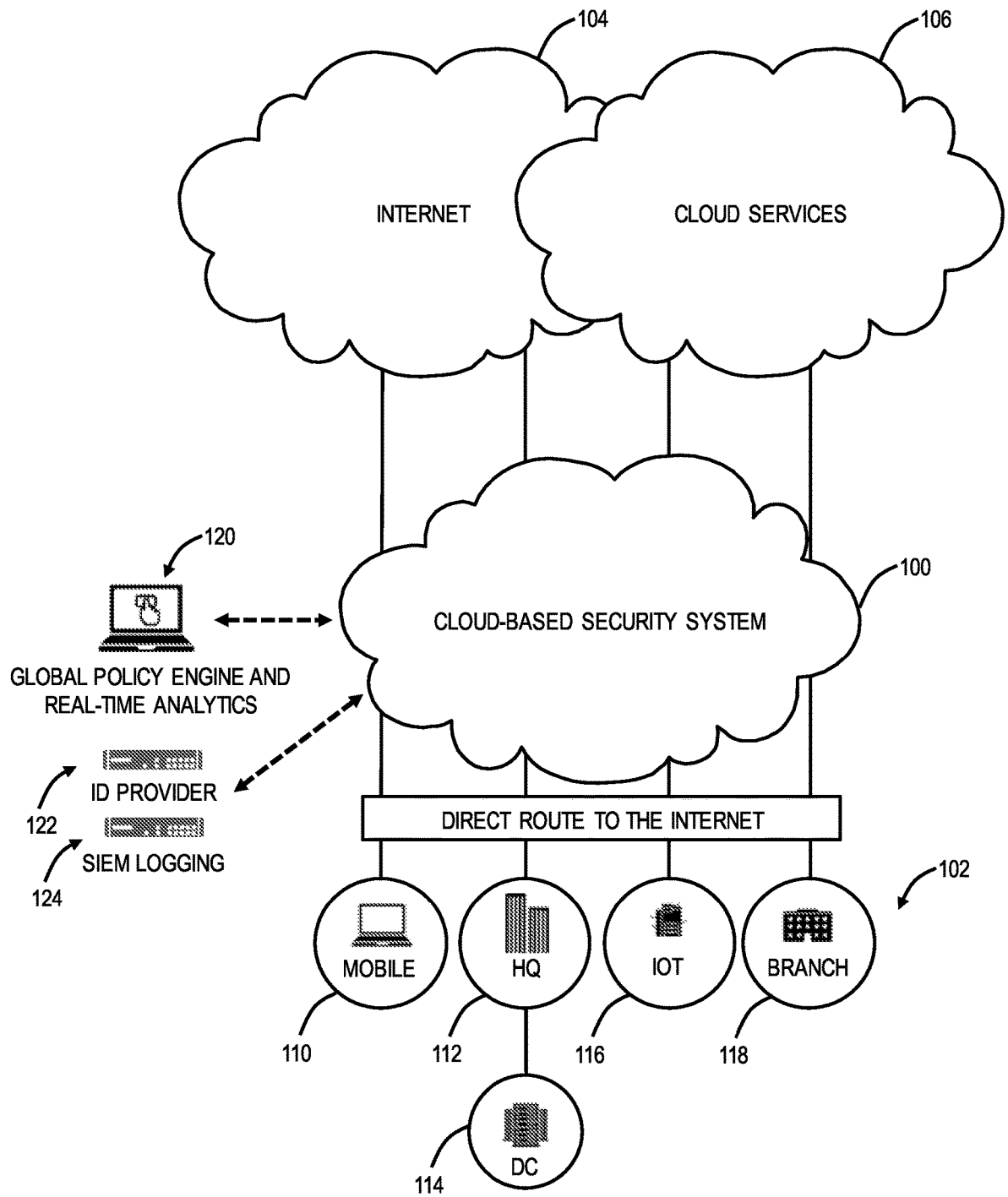
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not. A description of DLP functionality is provided in commonly-assigned U.S. patent application Ser. No. 16/923,225, filed Jul. 8, 2020, and entitled "Data Loss Prevention via Indexed Document Management," the contents of which are incorporated by reference herein in their entirety.

Figure 3:
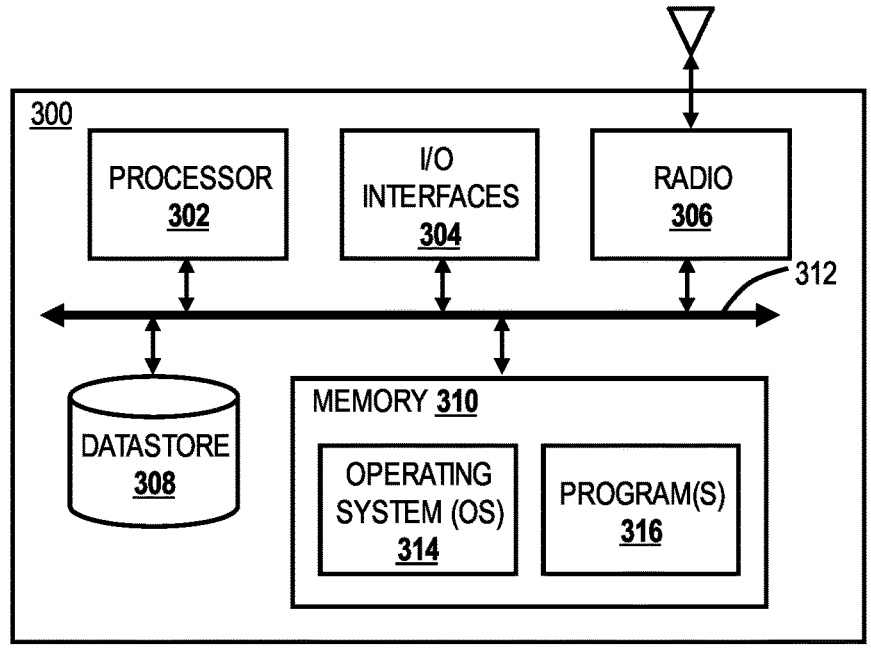

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 3). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant or company is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 106) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116 can use a local application that forwards traffic, a proxy such as via a Proxy Auto-Config (PAC) file, and the like. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Figure 1B:
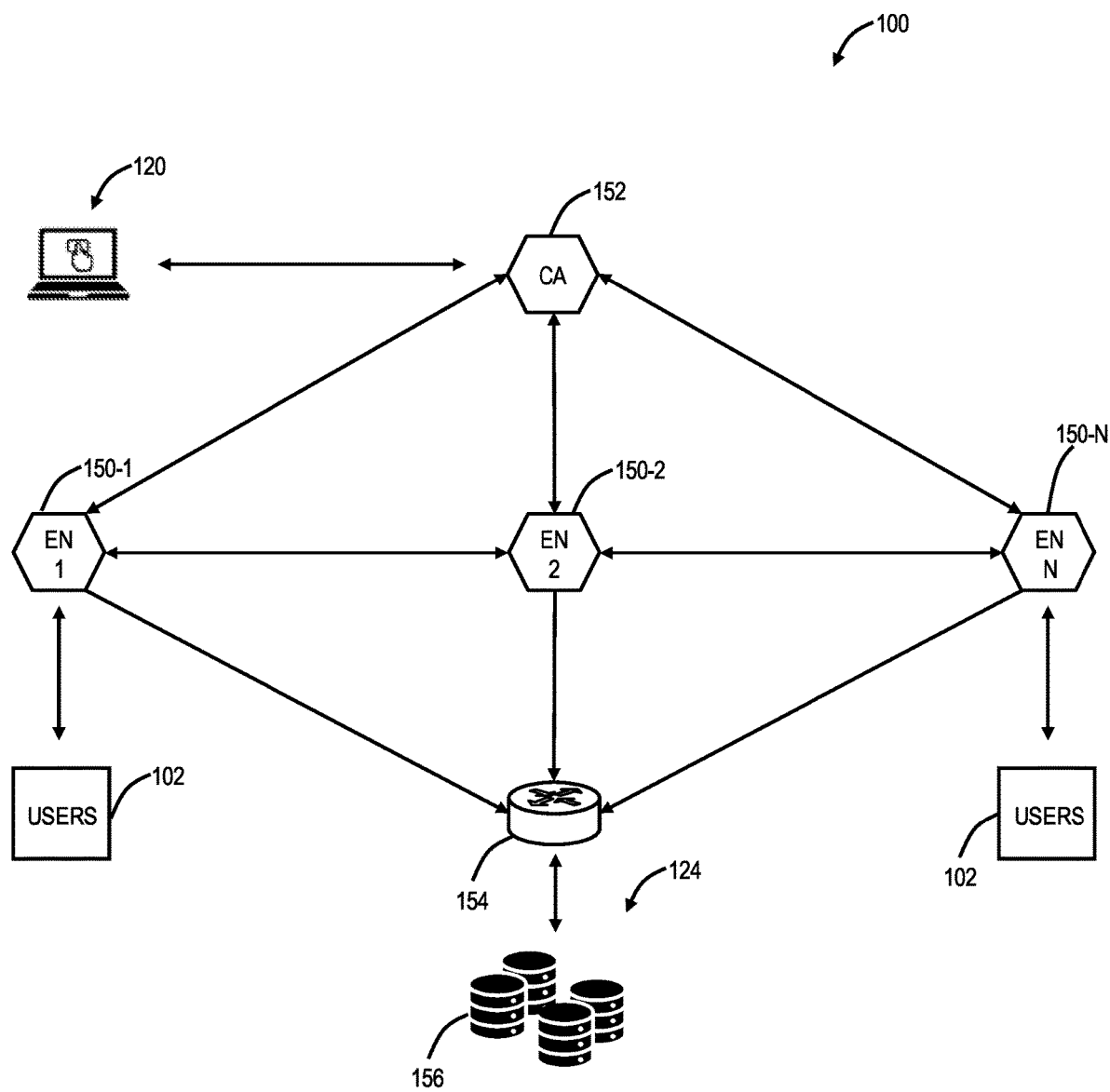
FIG. 1B is a network diagram of an example implementation of the cloud-based system of FIG. 1.

FIG. 1B is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150, 152, while described as nodes, can include one or more servers, including physical servers, virtual machines (VM) executed on physical hardware, etc. That is, a single node 150, 152 can be a cluster of devices. An example of a server is illustrated in FIG. 1B. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150.

The enforcement nodes 150 are full-featured secure internet gateways that provide integrated internet security. They inspect all web traffic bi-directionally for malware and enforce security, compliance, and firewall policies, as described herein. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure TLS connections to the log routers 154 that direct the logs to the storage cluster 156, hosted in the appropriate geographical region, for each organization.

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

Once downloaded, a tenant's policy is cached until a policy change is made in the management system 120. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Other cloud services can include Office 365, Dropbox, Box, Google Drive, Salesforce, and the like. In the context of these services, a provider of such cloud services can be referred to as a cloud provider, a SaaS provider, etc., and may utilize a hardware architecture similar to the cloud-based system 100. Of course, other types of cloud architectures are also contemplated.

Example Server Architecture

Figure 2:
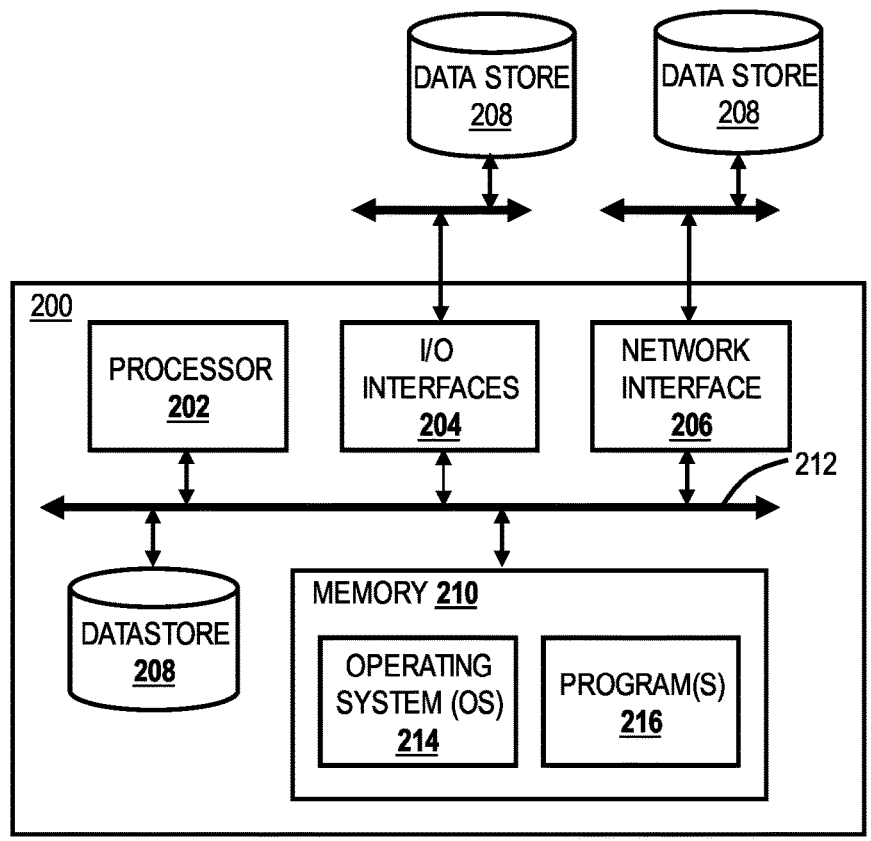

FIG. 2 is a block diagram of a server 200, which may be used in the cloud-based system 100, in a CASB system, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter (e.g., 10BaseT, Fast Ethernet, Gigabit Ethernet, 10 GbE) or a Wireless Local Area Network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Example User Device Architecture

FIG. 3 is a block diagram of a user device 300, which may be used in the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a radio 306, a data store 308, and memory 310. It should be appreciated by those of ordinary skill in the art that FIG. 3 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The radio 306 enables wireless communication to an external access device or network. Any number of suitable wireless data communication protocols, techniques, or methodologies can be supported by the radio 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

CASB System

Figure 4:
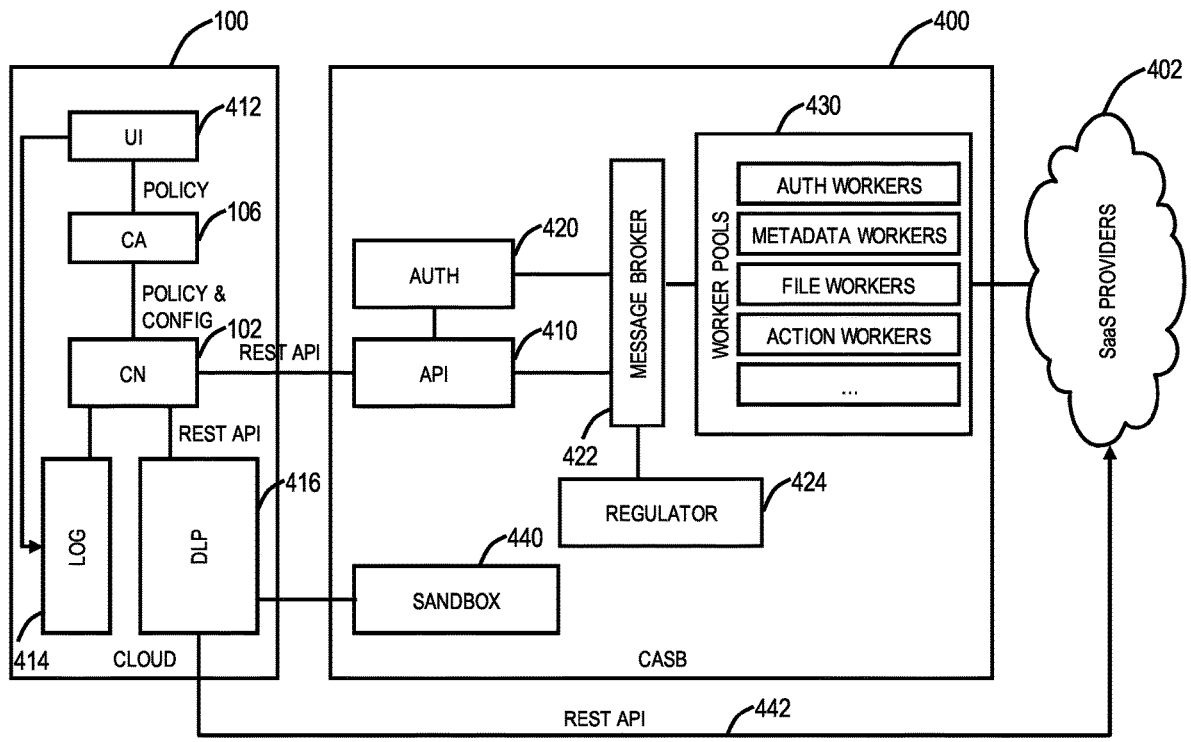
FIG. 4 is a network diagram of a CASB system.

FIG. 4 is a network diagram of a CASB system 400. The CASB system 400 can be located between the cloud-based system 100 and one or more SaaS providers 402. As described herein, the SaaS providers 402 can be referred to as cloud providers, cloud service providers, service providers, etc. Examples of the providers 402 include, without limitation, Office 365, Dropbox, Box, Google Drive, Salesforce, etc. That is the providers 402 can provide cloud services for enterprises related to file sharing, document management, email, collaboration, scheduling, timekeeping, financial, etc. The key point is the enterprise IT is moving from local applications hosted and maintained within the enterprise network to cloud-based solutions where the data is located off-site, in the providers 402.

The CASB system 400 can be implemented in a cloud-based system, such as using the architecture of the cloud-based system 100. The CASB system 400 can be implemented in a private cloud, a public cloud, or a hybrid cloud. Alternatively, the CASB system 400 can be one or more servers 200 that can be located on-premises with an enterprise, off-premises, etc. Even further, the CASB system 400 can be collocated with the SaaS providers 402. That is, various architecture implementations are contemplated. Further, the CASB system 400 contemplated both operations with the cloud-based system 100, operating as a distributed security system, as well as independent operation (i.e., with the components of the cloud-based system 100 omitted in FIG. 4, and with the functionality incorporated in the CASB system 400 itself).

The objective of the CASB system 400 is to provide enterprise IT control over data (resources) in the SaaS providers 402. Note, as described herein, the enterprise can be referred to as a tenant of the provider 402. The CASB system 400 is configured to operate as a distributed file crawler for files associated with a particular tenant. The CASB system 400 can both provide a report based on the file crawling as well as implement policy actions based on policy configuration.

The CASB system 400 includes one or more APIs 410, such as a Representational state transfer (REST) API. In an embodiment, the APIs 410 connect to the cloud-based system 100, such as one of the enforcement nodes 150. Here, a user can interact with the CASB system 400 via a User Interface (UI) 412 through the central authority 152. Additionally, the enforcement node 150 can connect to a log 414, such as a data store that stores statistics and transactions, for reporting. The enforcement node 150 can also connect to a DLP engine 416 for data leakage protection through the CASB system 400. Here, the CASB 400 can be used to identify content, files, etc. that match sensitive data in a DLP dictionary. The user can provide policy and configuration via the UI 412.

Again, the CASB system 400 can be deployed without the cloud-based system 100. Here, the API 410 can connect directly to the UI 412, and the log 414 and the DLP engine 416 can be incorporated directly in the CASB system 400, or in an external system.

The CASB system 400 includes an authentication provider 420 that is configured to perform authentication of the tenant with the SaaS providers 402. The APIs 410 and the authentication provider 420 connect to a message broker 422, which is configured to interact between the APIs 410, the authentication provider 420, and a plurality of workers 430. A regulator 424 is connected to the message broker. The message broker 422 is a pipeline where job tickets are queued for consumption by the workers 430.

In an embodiment, the authentication provider 420, a controller for the APIs 410, the regulator 424, and the workers 430 are Java Spring services, and other embodiments are also contemplated. The message broker 422 can be a queuing service, such as using Apache Kafka, Microsoft EventHub, or other embodiments. The API controller is a liaison service that interfaces between the CASB system 400 and the cloud-based system 100.

With respect to the authentication provider 420, customer information, including tokens and credentials are not stored permanently or persisted. Also, the CASB system 400 is not tied specifically to a particular SaaS provider 402. That is, the CASB system 400 is configured to operate with multiple, different SaaS providers 402. This is accomplished through customized APIs and configuration of the workers 430. Each SaaS provider 402 can have a different set of APIs and functionality.

The workers 430 are connected to the SaaS providers 402 and are dedicated to performing particular tasks. In a sense, the plurality of workers 430 are organized in a pool of workers, and tasks are assigned between the workers 430. The CASB 400 can include a sandbox 440 that can be connected to the DLP engine 416, and the DLP engine 416 can also include a REST API 445 connection to the SaaS providers 402. Note, the sandbox 440 can be included in the CASB system 400, or it can be an external system. The sandbox 440 is configured to execute files, open files, etc. in a safe environment to analyze whether the files are malicious or not.

The worker pool is a collection of workers 430 that interact with the SaaS provider 402 and perform specific tasks. The pool of workers 430 enables the CASB system 400 to operate efficiently in a distributed nature. The workers 430 are assigned tasks from various queues, via the message broker 422 and the regulator 424. Thus, the workers 430 can operate akin to an assembly line, and there can be hand-offs between workers 430. For example, the workers 430 can include authentication workers to authenticate users, tenants, etc., metadata workers to analyze file or content metadata, file workers to scan/analyze files, action workers to perform various policy-related actions, and the like.

The workers 430 can logically be viewed as contract workers in a factory, on an assembly line, etc. The workers 430 are provided specific instructions in a job ticket. The job ticket has information on what job to be performed, where to get the inputs, and where to send the outputs. Every worker 430 also knows what to do when something goes wrong.

The regulator 424 is like the SCADA (Supervisory Control and Data Acquisition) in a control system architecture. The regulator 424 monitors the performance of all the workers 430 and controls the overall system for optimum throughput.

Job Ticket Example

Again, the message broker 422 assigns jobs to the workers 430. Here is an example of a job ticket for an example job:

```
{
TenantID : 123456
TransactionID : 111111
JobType : GetTenantUsers
Run ID : 1
SaaSProvider : Google Drive
...
...
...
}
```

Design Constraints

Again, each different SaaS provider 402 can have a different set of APIs and functionality. The CASB system 400 is configured to interface with a plurality of different SaaS providers 402. The log 414 can be configured to store changes/events for an entire organization, including on a per user basis.

The APIs between the CASB 400 and the SaaS providers 402 may be limited, e.g., throttled by the SaaS providers 402. As such, there is an initial baseline crawl (i.e., a first-run) where the CASB system 400 has to crawl and scan all files in the SaaS provider 402. This initial baseline crawl is performed efficiently and is synchronized with the DLP engine 416. After the baseline crawl, subsequent crawls are performed incrementally, namely through files that changed since the previous crawl. For example, the first run can be referred to as run one, and each incremental crawl is run X, which only scans and crawls files that have changed since run X-1. In an embodiment, the period of incremental calls is once a day. Of course, other periods are also contemplated.

File Crawl

The SaaS providers 402 generally provide two ways to crawl through the files for a tenant, namely crawling based on organization-wide file activity or a change log and crawling based on a pseudo-breadth-first traversal. The file activity or a change log enables crawling based on file changes. The pseudo-breadth-first traversal is crawling based on snapshots.

Figure 5:
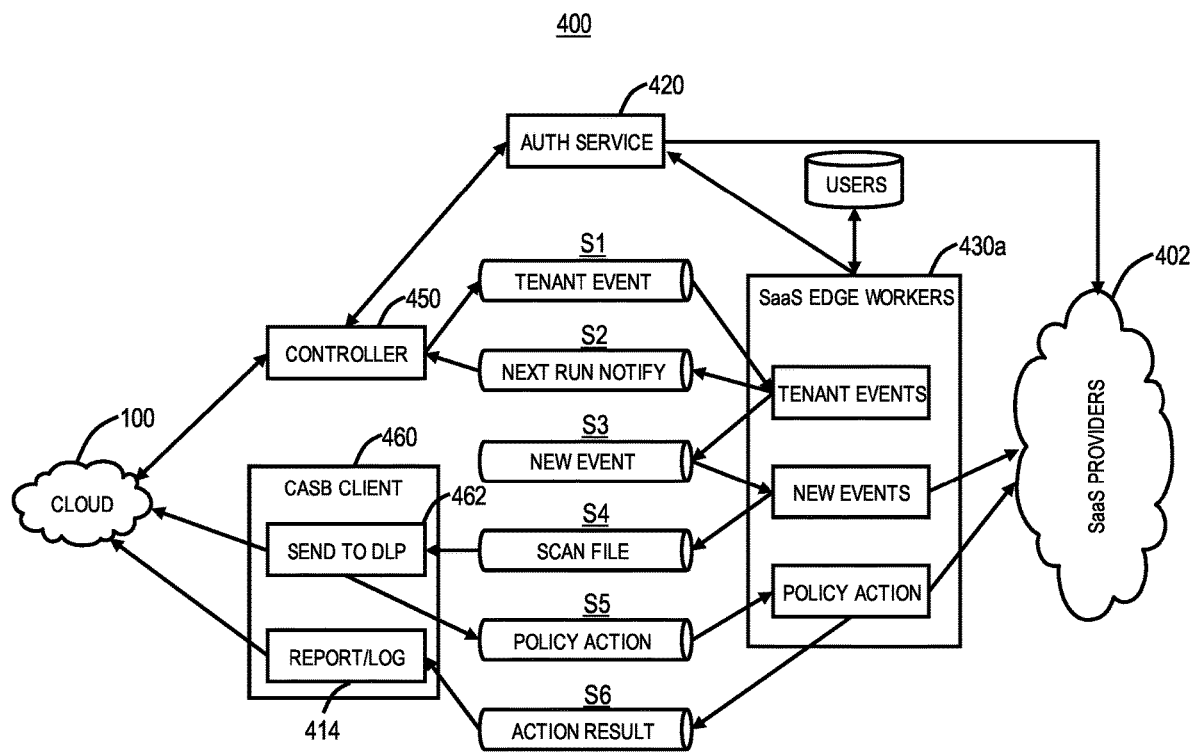
FIG. 5 is a functional block diagram of filing crawling of the SaaS provider with the CASB system.

FIG. 5 is a functional block diagram of filing crawling of the SaaS provider 402 with the CASB system 400. Specifically, FIG. 5 illustrates functionality associated with file crawling in the SaaS provider 402 by the CASB 400. The CASB 400 includes a controller 450, such as the message broker 422 and the regulator 424. The controller 450 can communicate with the cloud-based system 100 and the authentication provider 420. The authentication provider 420 can communicate with the SaaS providers 402. The CASB 400 can also include a CASB client 460 that includes a worker for DLP 462 and the log 414. In the example of FIG. 5, there are edge workers 430*a* that interface between the authentication provider 420, the SaaS provider 402, the controller 450, and the CASB client 460. The objective of the edge workers 430*a* is to perform file crawling of the SaaS providers 402. In an embodiment, the SaaS providers 402 can be file storage providers, such as, for example, Office 365 (SharePoint), Box, DropBox, etc.

For illustration, an example operation is described in FIG. 5. There is a tenant event (S1) from the controller 450 to the edge worker 430*a*. The next run notification (S2) is provided from the edge worker 430*a* after all files are crawled in the run. The edge worker 430*a* notes a new event (S3) with file meta-data, the edge worker 430*a* fetches file details and provides a file for scanning (S4) which is sent to DLP 562 for scanning and analysis. A policy action (S5) can be the result of the DLP 562 and provided to the edge worker 430*a*. The edge worker 430*a* can implement the policy action in the SaaS provider 402 and provide the result (S6) for the log 414. For example, a policy action can be to delete a file, quarantine a file, flag a file, etc.

Crawling Based on a Change Log

Figure 6:
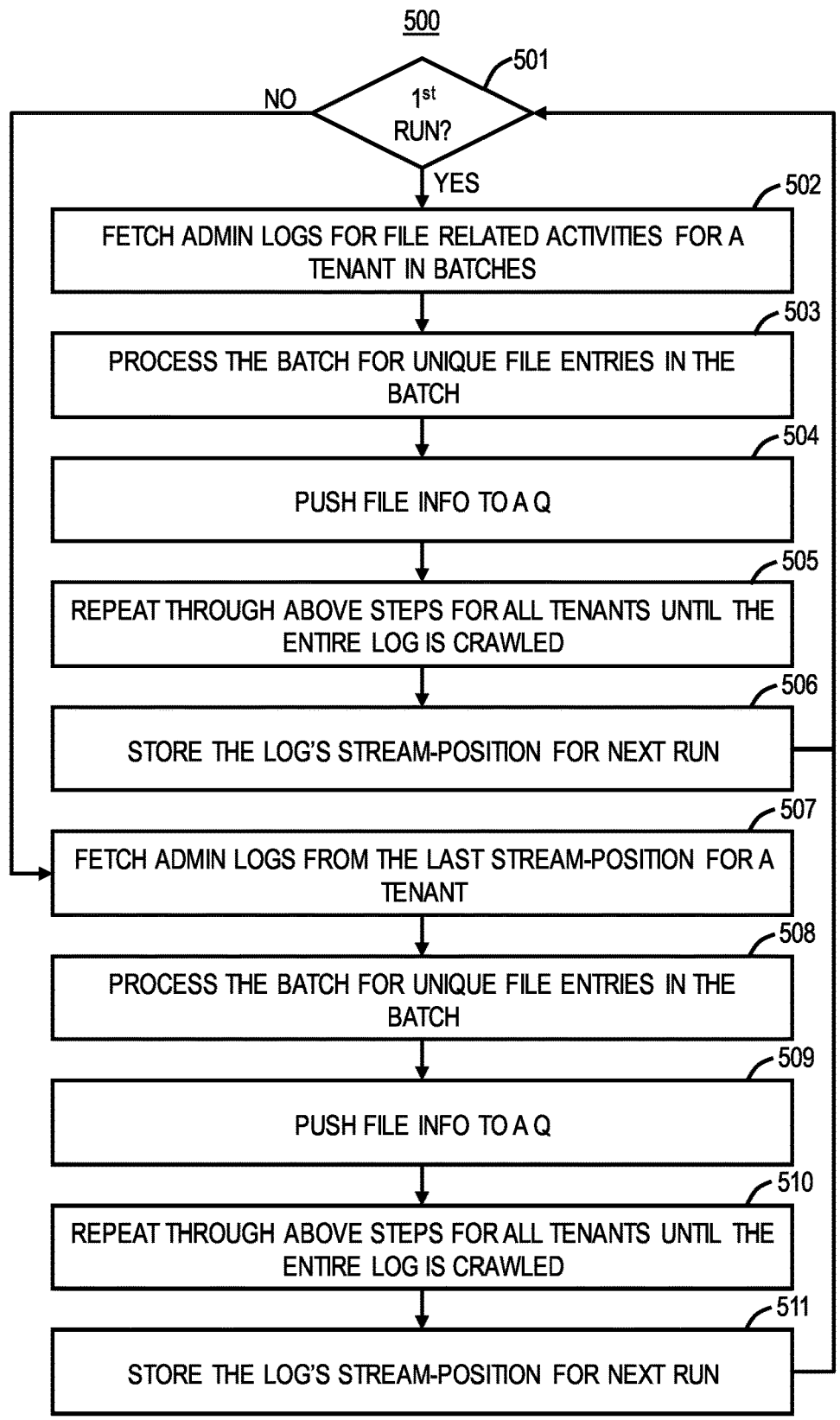
FIG. 6 is a flowchart of a file crawling process based on a change log.

FIG. 6 is a flowchart of a file crawling process 500 based on a change log. The file crawling process 500 contemplates implementation by the CASB system 400 to crawl the SaaS provider 402. The file crawling process 500 includes, for a first run (step 501), fetching admin logs for file-related activities for a tenant in batches (step 502), processing the batch for unique file entries in the batch (step 503), pushing the file info into a queue (Q) (step 504), repeating steps 503, 504 until the entire log is crawled (step 505), and storing the log's stream-position for a next Run (step 506).

For a run X (step 501) where X is an integer greater than 1, the file crawling process 500 includes, fetching admin logs from the last stream-position for a tenant (step 507), processing the batch for unique file entries in the batch (step 508), pushing file info to a queue (Q) (step 509), repeating through above steps 508, 509 for all tenants until the entire log is crawled (step 510), and storing the log's stream-position for a next Run (step 511).

Crawling Based on the Breadth-First Traversal

Figure 7:
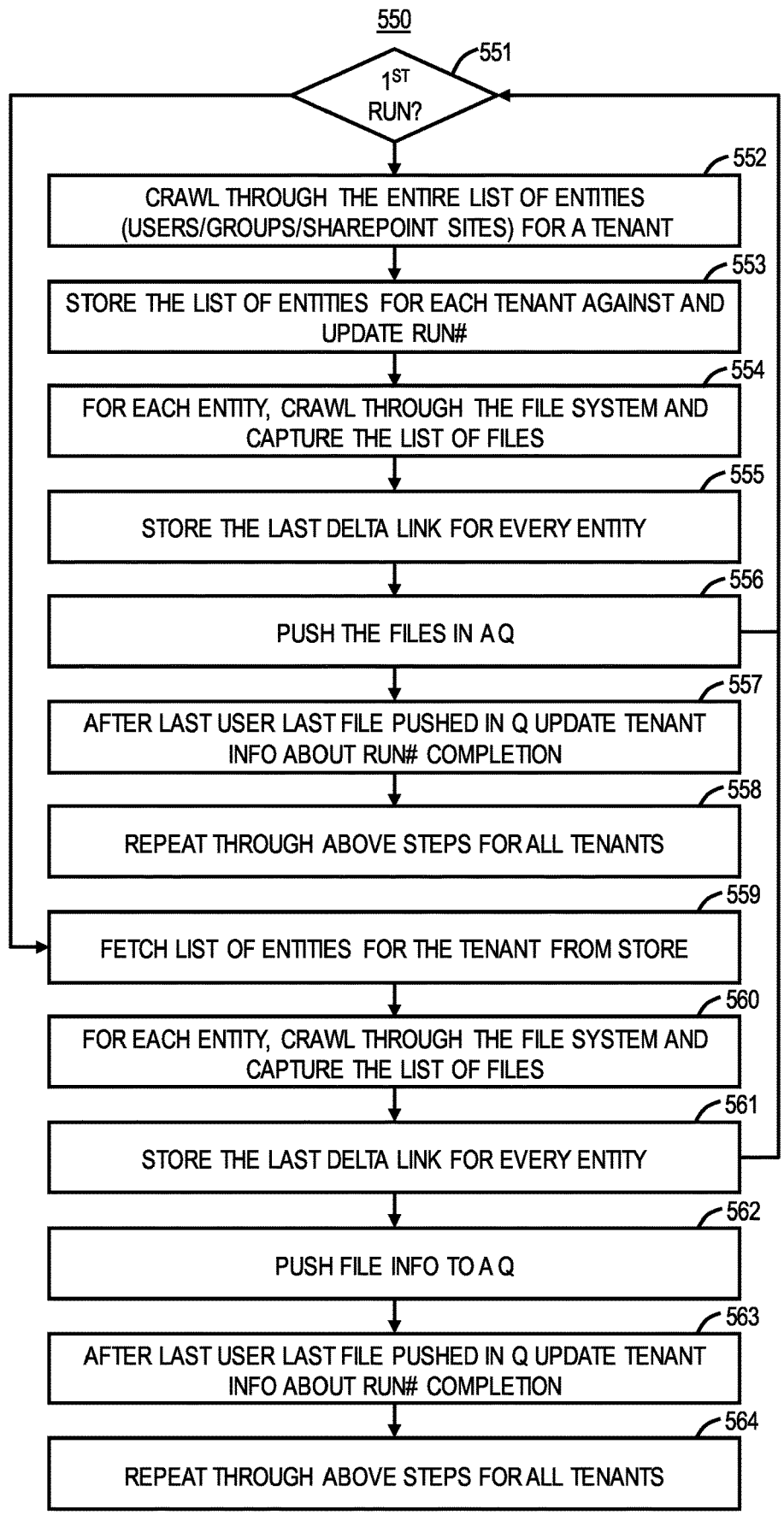
FIG. 7 is a flowchart of a file crawling process based on breadth-first traversal.

FIG. 7 is a flowchart of a file crawling process 550 based on breadth-first traversal. The file crawling process 550 contemplates implementation by the CASB system 400 to crawl the SaaS provider 402. For example, some SaaS providers 402 may not maintain a change log for a tenant, but instead, provide a snapshot of a user's filesystem and then a change log for every user. The file crawling process 500 includes, for a first run (step 551), crawling through the entire list of entities (Users/Groups/SharePoint Sites) for a tenant (step 552), and storing the list of entities for each tenant against and update Run # (step 553). For each entity, the file crawling process 550 includes, crawling through the File System and capturing the list of files (step 554), storing the last delta link for every entity (step 555), and pushing the files in a queue (Q) (step 556). The file crawling process 550 includes, after the last user, the last file pushed in the queue (Q), updating tenant info about Run # completion (step 557), and repeating through the above steps for all tenants (step 558).

For run X (step 551) where X is an integer greater than 1, the file crawling process 550 includes fetching a list of entities for the tenant from a store (step 559), for each entity, crawling through the File System and capture the list of files (step 560), storing the last delta link for every entity (step 561), pushing the files in a queue (Q) (step 562), after the last user last file pushed in the queue (Q), updating tenant info about Run # completion (step 563), and repeating through above steps for all tenants (step 564).

Flow Diagram

Figure 8:
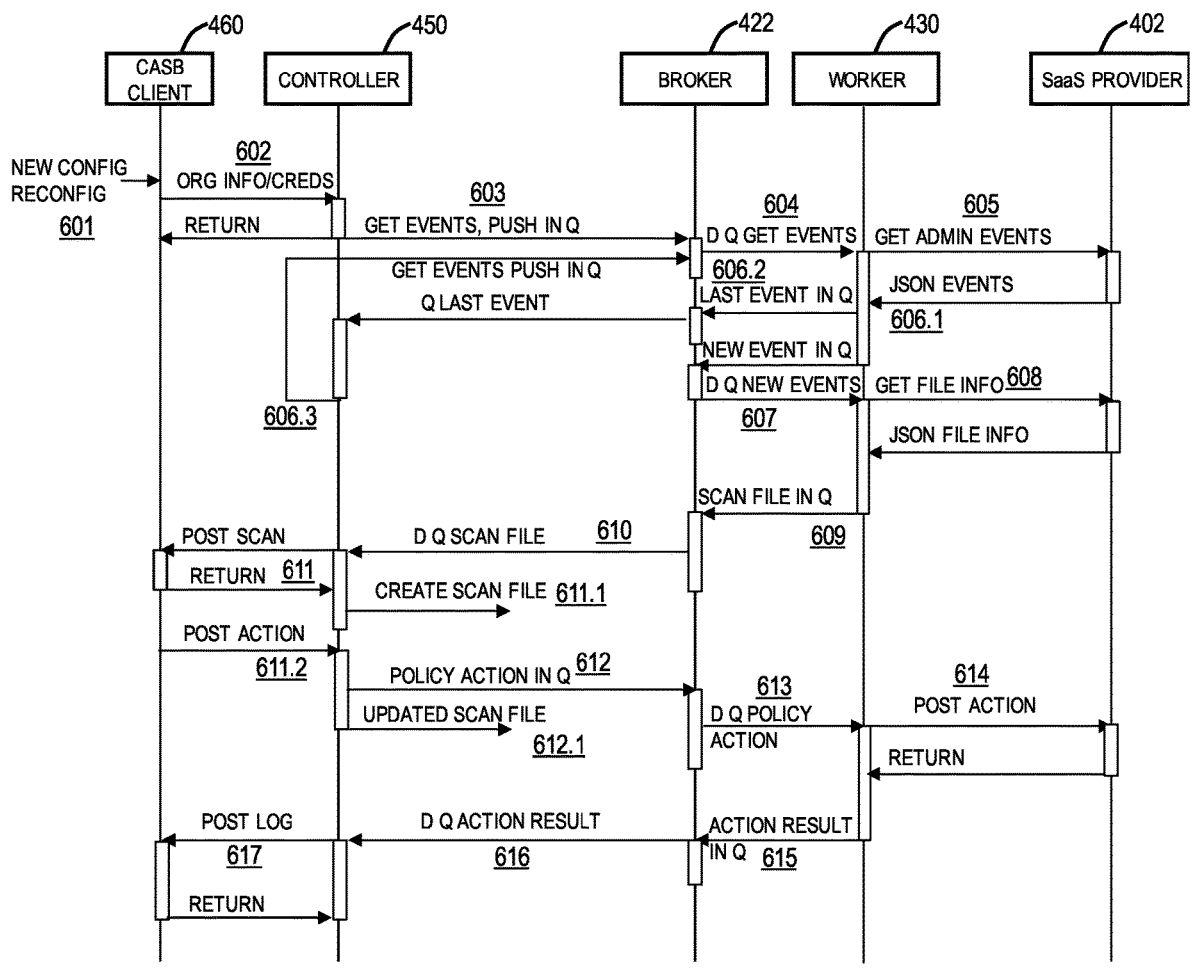
FIG. 8 is a flow diagram of example operations between the CASB client, the controller, the message broker, a worker, and the SaaS provider.

FIG. 8 is a flow diagram of example operations between the CASB client 460, the controller 450, the message broker 422, a worker 430, and the SaaS provider 402. A new configuration or reconfiguration is provided, via the CASB client 460, the cloud-based system 100, etc. (step 601), and organization (tenant) information and credentials are provided to the controller 450 (step 602). The controller 450 gets events and pushes them in a queue (Q). The message broker 422 is configured to dequeue (D Q) the events and assign it to the worker 430 (step 604). The worker 430 is configured to interact with the SaaS provider 402 to get admin events (step 605), which are provided as JavaScript Object Notation (JSON) events (step 606.1). The process is continued until the queue is emptied, the last event in the queue (step 606.2, 606.3).

The worker 430 can add new events in the queue, and the broker 422 can dequeue the new events when assigning back to a worker 430 (step 607). The worker 430 gets file info (step 608) and receives JSON file info from the SaaS provider 402. The worker 430 can scan each file in the queue (step 609), provide results to the controller 450, which dequeues the scanned file (step 610).

The controller 450 can provide results of the scan to the CASB client 460, which returns information (step 611). The controller 450 can create a scan file (step 611.1) and receive a post-action (step 611.2) from the CASB client 460. For example, the CASB client 460 may perform DLP, and the action can be allow, delete, quarantine, etc. The controller 450 can implement the policy action in the queue (step 612), the brokers 422 can dequeue the policy action (step 613) and assign the action to the worker 430 which posts the action in the SaaS provider (step 614). The worker 430 can provide the action result in a queue (step 615), the broker 422 can dequeue the action results (step 616) and post the action result in the log (step 617).

Webhook Integration

A webhook in web development is a method of augmenting or altering the behavior of an application with custom callbacks. These callbacks may be maintained, modified, and managed by third-party users and developers who may not necessarily be affiliated with the originating website or application. Webhooks are user-defined Hypertext Transfer Protocol (HTTP) callbacks that can be triggered by some event, such as in a SaaS application detecting modification of content. When that event occurs, the SaaS application makes an HTTP request to the URL configured for the webhook. Users can configure them to cause events on one site to invoke behavior on another. SaaS applications from the SaaS providers 402 are configured to support webhooks. Webhooks operation can be compared to APIs. In APIs, one pulls data from a provider. In Webhooks, the SaaS provider 402 pushes data out, e.g., the present disclosure utilizes webhooks for identifying real-time modifications of content in SaaS applications.

The present disclosure is described with reference to the CASB system 400, including all of the various architecture implementations described herein. Again, the CASB system 400 can be provided using the cloud-based system 100, in another cloud (e.g., private cloud, public cloud, hybrid cloud, etc.), as one or more servers 200 (e.g., an appliance located on-premises with an enterprise, off-premises, etc. as well as collocated with the SaaS providers 402). Note, the CASB system 400 as described herein is configured to provide CASB functionality, which may also be referred to as a CASB service. Again, the CASB service functions between the SaaS service users and the SaaS applications from the SaaS providers 402. Among the many services, CASB provides the most critical ones include identify and protect malware and policy enforcement (DLP).

The present disclosure contemplates an organization (i.e., a tenant, a corporation, an enterprise, etc.) having multiple SaaS applications and multiple users spread across multiple countries, states, cities, etc. (generally geography) providing protection as soon as possible with the CASB system 400. That is, the CASB system 400 is configured to scan data, prevent data loss, etc. at near real-time for critical protection. To that end, the CASB system 400 is configured to detect changes in data as soon as a user 102 is active and modifies the data. Further, the CASB system 400 is configured to scan data closest to the source, using geolocation, and scanning in compliance with local law and regulations.

CASB System with Webhooks Integration

Figure 10:
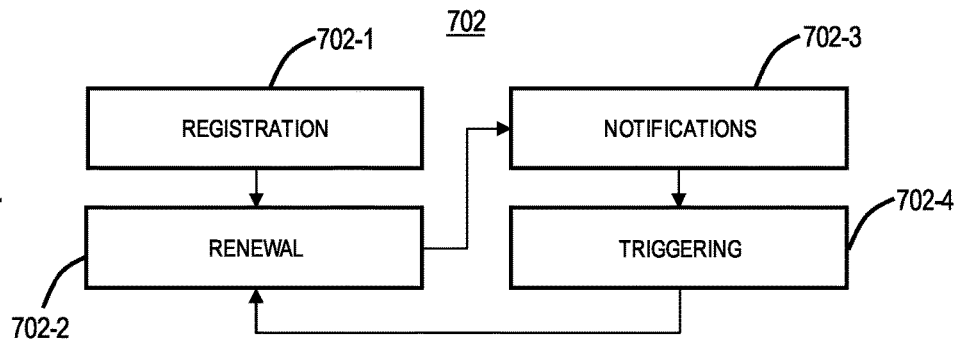
FIG. 10 is a flowchart of a CASB-webhooks integration process, that may be implemented through the CASB-webhooks system of FIG. 10, or in other approaches.
Figure 9:
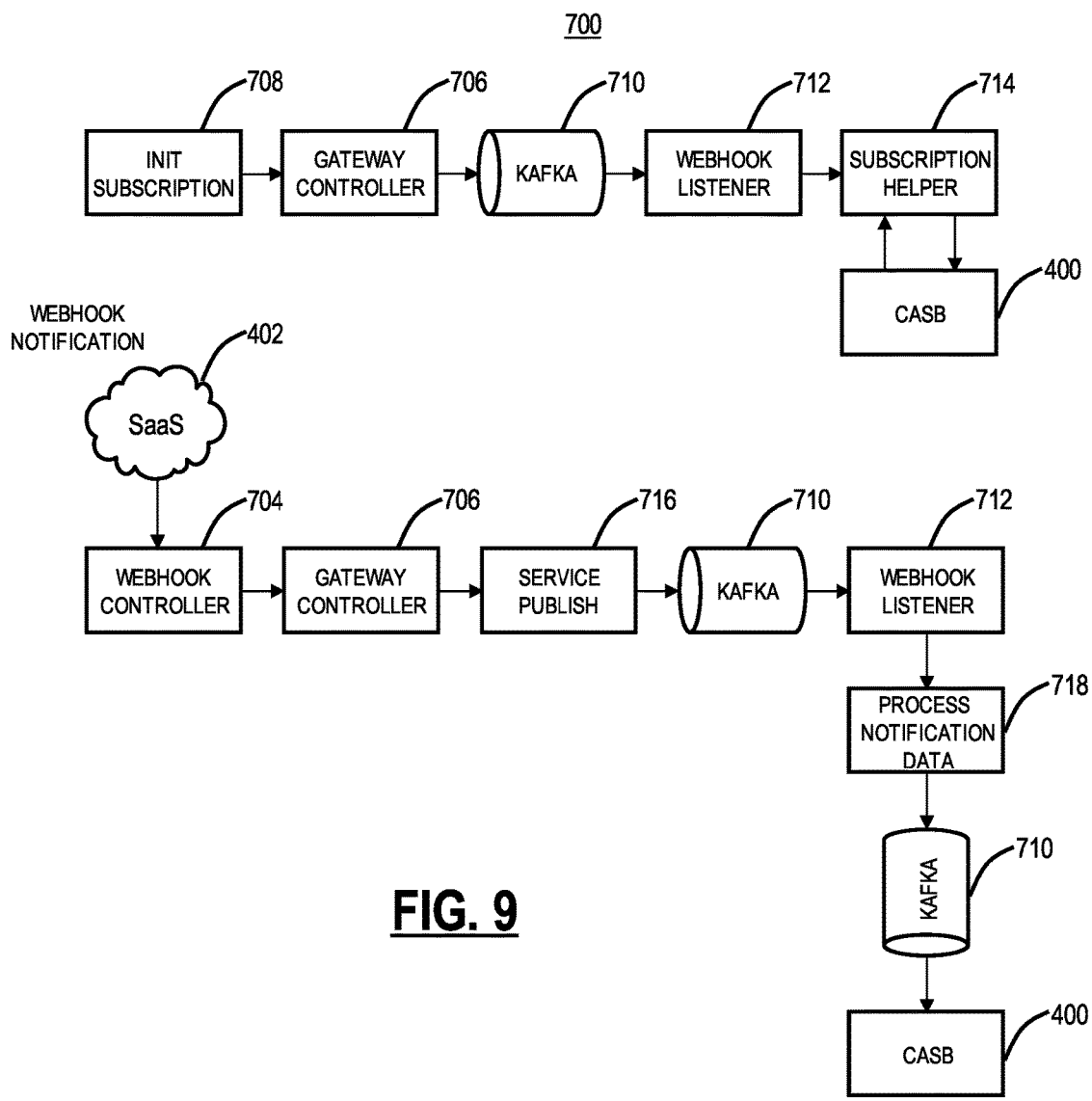
FIG. 9 is a flow diagram of an architecture of a CASB-webhooks system.

FIG. 9 is a flow diagram of an architecture of a CASB-webhooks system 700, and FIG. 10 is a flowchart of a CASB-webhooks integration process 702, which may be implemented through the CASB-webhooks system 700, or in other approaches. The CASB-webhooks system 700 and the CASB-webhooks integration process 702 operate with the constraint that there is no replication of user data. The CASB-webhooks system 700 includes various components including a webhook controller 704, a gateway controller 706, an initiate subscription component 708, a data stream processing system 710 such as Apache Kafka, a webhook listener component 712, a subscription helper component 714, a service publish component 716, and a process notification component 718.

Note, these various components 704-718 can be physical or logical components that are part of the CASB-webhooks system 700 and perform the CASB-webhooks integration process 702. The components 704-718 can be executed on one or more servers, including physical servers, virtual machines (VM) executed on physical hardware, etc. The components 704-718 can be integrated into one another, and FIG. 9 is illustrated to show functional operation. Those skilled in the art will recognize various approaches are contemplated. Also, in an embodiment, the components 704-718 can be separated from the CASB system 400. In another embodiment, some or all of the components 704-718 can be included in the CASB system 400. In a further embodiment, some or all of the components 704-718 can be included with the SaaS providers 402. Of course, a combination of any of these approaches is also contemplated. Also, any of the components 704-718 may include one of the worker 430 in the CASB system 400, as well as a worker 430 outside of the CASB system 400.

The CASB-webhooks integration process 702 includes registration (step 702-1), renewal (step 702-2), notifications (step 702-3), and triggering (step 702-4). Variously, the notifications step 702-3 and the triggering step 702-4 can be implemented by the components 704, 706, 716, 710, 712, 718, 710 in communication with the SaaS provider 402 and the CASB system 400 (bottom half of FIG. 9), and the components 708, 706, 710, 712, 714 in communication with the CASB system 400 (top half of FIG. 9) can be used to manage the subscriptions, i.e., the registration step 702-1 and the renewal step 702-2.

Generally, the registration step 702-1 involves identifying the users 102 of a tenant, and this can be a process where IT admin performs configuration through the CASB system 400. The registration step 702-1 can further include specifying monitoring functions per user, per group, per tenant, etc.

Figure 11:
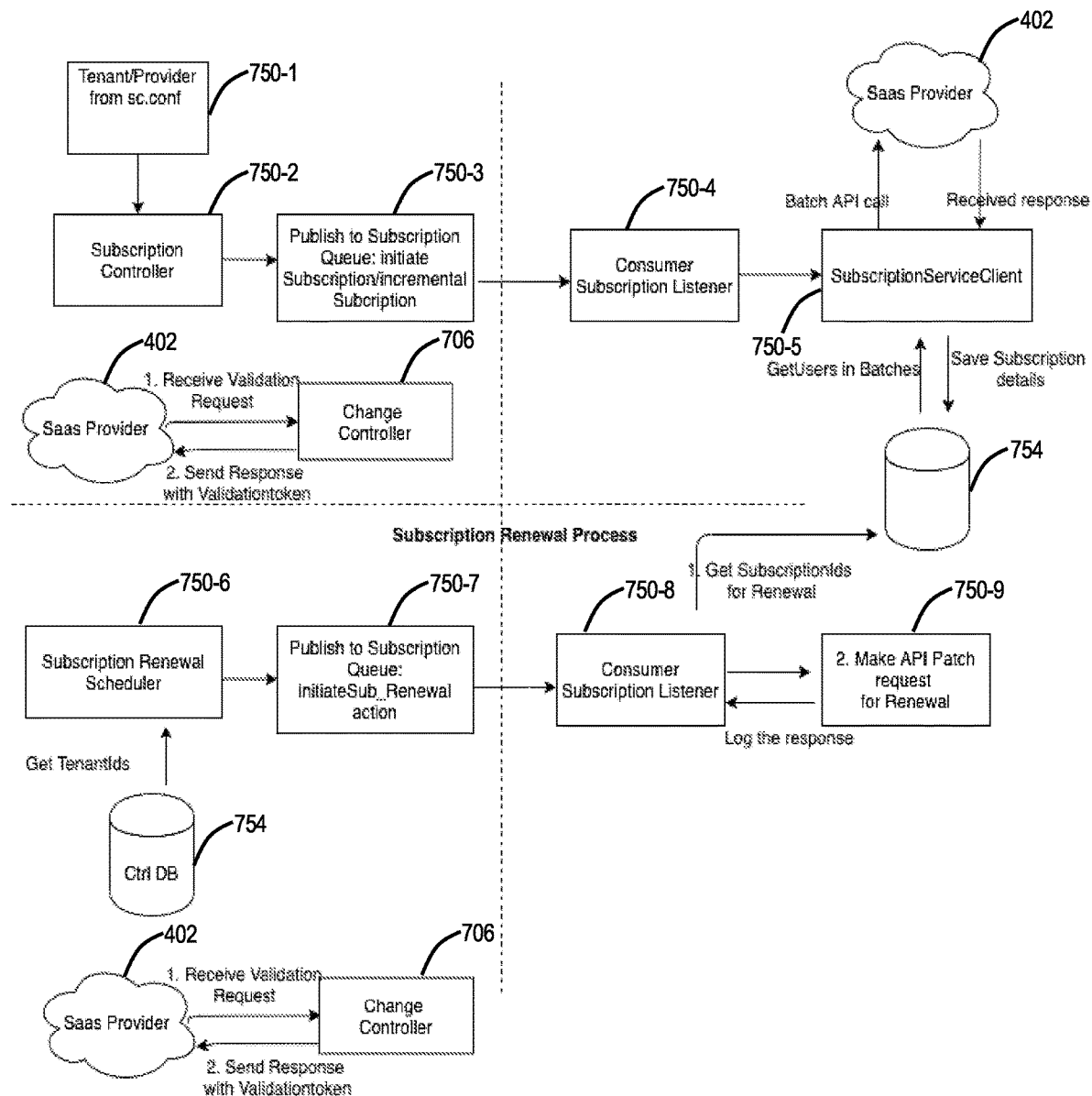
FIG. 11 is a flow diagram of subscription and renewal process for the registration step and the renewal step in the CASB-webhooks integration process.

FIG. 11 is a flow diagram of subscription and renewal process 750 for the registration step 702-1 and the renewal step 702-2. The subscription and renewal process 750 includes a tenant (or a provider) providing a configuration (step 750-1). This can be through the central authority 152, the CASB client 460, etc. The configuration can include a tenant identifier, user identifiers, actions for monitoring, content for monitoring, etc. The configuration is provided to a subscription controller (step 750-2). The subscription controller can publish the configuration to a subscription queue (step 750-3), which connects to a consumer subscription listener (step 750-4) that connects to a subscription service client (step 750-5). The subscription service client interfaces the SaaS provider 402 via batch API calls and receives responses for managing the subscriptions and configuration. This data can be stored in a database 754.

Generally, the renewal step 702-2 involves periodically renewing the subscriptions based on the timing of the SaaS provider 402. The renewal step 702-2 operates based on a timer for each different SaaS provider 402 from a scheduler (step 750-6). The scheduler publishes to the subscription queue (step 750-7), which connects to the consumer subscription listener (step 750-8). The consumer subscription listener, which can be one of the workers 430, is configured to get subscriptions that need to be renewed and to make batch API patch requests for renewal to the SaaS provider 402 (step 750-9). For subscription and renewal, the interaction between the SaaS provider 402 can be via controller 706.

Referring back to FIG. 9, generally, the components 708, 706, 710, 712, 714 communicate with the CASB system 400 for managing the subscriptions. The notifications step 702-3 includes receiving multiple notifications via webhooks that certain users and modifying certain content. The notifications can identify the user, the content, the event type (save, delete, add, etc.). The webhook notification is provided from the SaaS provider 402 based on the subscriptions to the webhook controller 704, which connects to the gateway controller 706, which publishes the notifications (service publisher 716) to the data stream processing system 710. The webhook listener 712 detects notifications from the data stream processing system 710 and causes a process notification 718, which can also be provided to the data stream processing system 710, for action by the CASB system 400.

The triggering step 702-4 generally includes taking the notifications from the data stream processing system 710 that were caused by webhooks and acting upon them in the CASB system 400. This action can include any of the monitoring and scanning functions described herein. Of note, the notifications step 702-3, and the triggering step 702-4 can be used by the CASB system 400 for detection of which users 102 to process, to identify the event type and process with delay or process instantly, etc. Further, the notifications step 702-3, and the triggering step 702-4 can be used by the CASB system 400 to identify which queue to push into.

Geolocation

Figure 12:
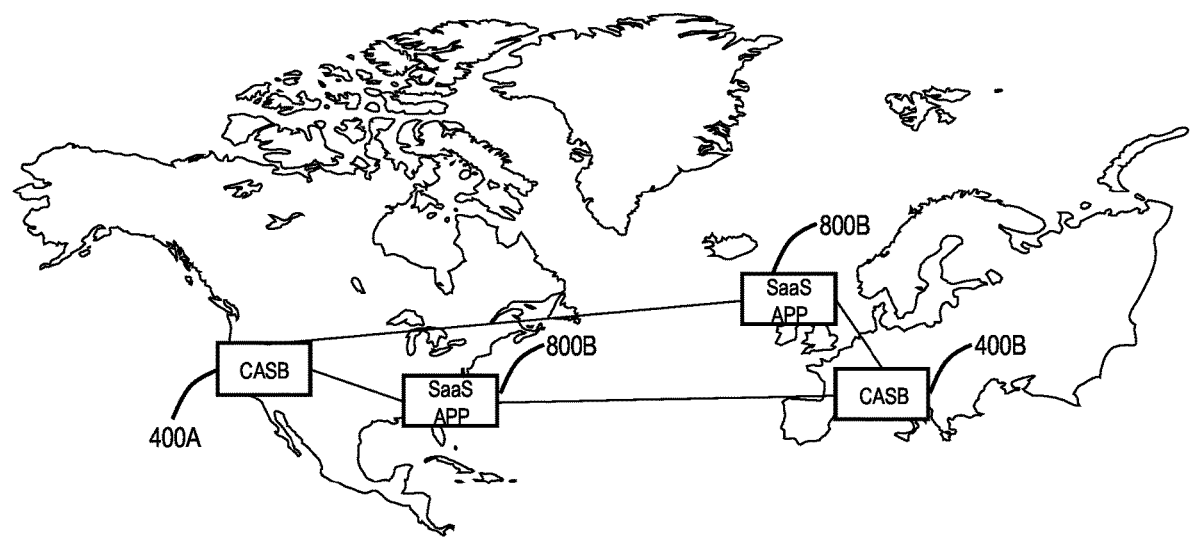
FIG. 12 is a map illustrating an example system including two CASB systems geographically distributed and two SaaS applications also geographically distributed.

FIG. 12 is a map illustrating an example system including two CASB systems 400A, 400B geographically distributed, and two SaaS applications 800A, 800B also geographically distributed. In this example, the CASB system 400A, 400B are single nodes in a composite CASB system 400. Scanning data via one of the CASB systems 400A, 400B includes downloading the data and performing policy actions or malware detection. The SaaS application 800 users in an organization can be located anywhere, and they download and upload data while using the SaaS applications 800.

Similarly, the SaaS applications 800 can distribute and store data across the globe. Thus, strategically downloading data is critical for fast actions and remediation. To achieve this, the present disclosure includes the CASB system 400 scanning data closest to the source, which is most of the time near the location of the user. For implementation, the CASB system 400 detects the geolocation of the users 102 via their user devices 300 and routes the scan requests to the closest CASB scanners, namely the CASB systems 400A, 400B. Geolocation of the users 102 can be fetched periodically.

Historical and Live Scanning Process

Figure 13:
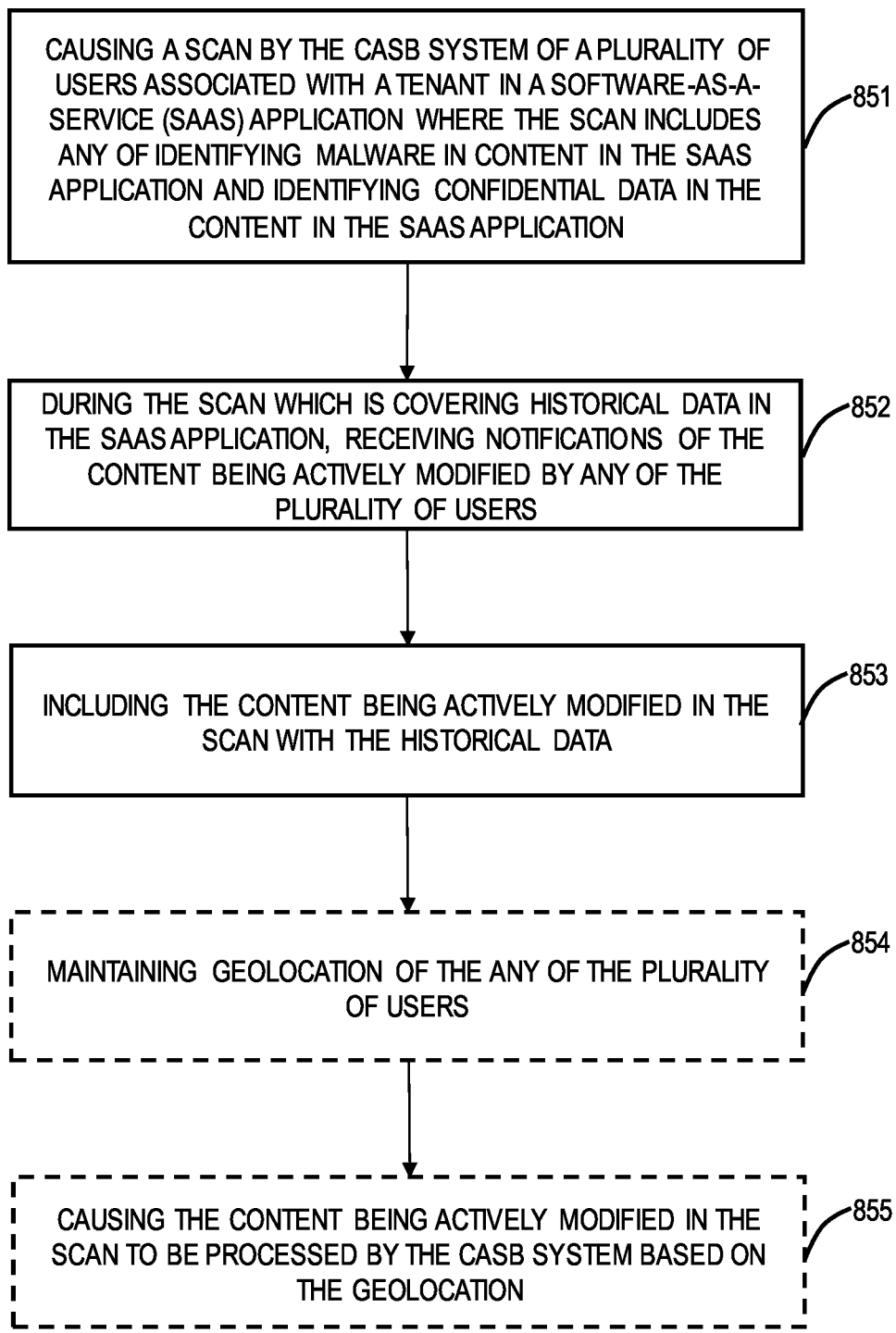
FIG. 13 is a flowchart of a historical and live scanning process for CASB functionality.

FIG. 13 is a flowchart of a historical and live scanning process 850 for CASB functionality. Tenants (customers) require scanning of historical data as well as live data that is being modified by users. Historical data is scanned, with the CASB system 400, by crawling the SaaS application using APIs. As described herein, the entities to be scanned are pushed into queues to be scanned. Along with historical data, the present disclosure can process live data modifications using webhooks. Notifications on changes are received, as described herein, and pushed into the queues. The CASB system 400 can then prioritizes the live modified data and perform the CASB functions. Specifically, historical scans are important, but they can tolerate latency. Live data modification requires scanning at near real-time speeds to detect problems and to limit the impact on the user 102 (i.e., the user 102 does not want to wait for each file, etc.).

The historical and live scanning process 850 can be implemented as a method, in a server 200, and as computer-readable code stored in a non-transitory computer-readable storage medium. The historical and live scanning process 850 includes causing a scan by the CASB system of a plurality of users associated with a tenant in a Software-as-a-Service (SaaS) application where the scan includes any of identifying malware in content in the SaaS application and identifying confidential data in the content in the SaaS application (step 851); during the scan which is covering historical data in the SaaS application, receiving notifications of the content being actively modified by any of the plurality of users (step 852); and including the content being actively modified in the scan with the historical data (step 853).

The historical and live scanning process 850 can further include maintaining geolocation of the any of the plurality of users (step 854); and causing the content being actively modified in the scan to be processed by the CASB system based on the geolocation (step 855). The historical and live scanning process 850 can further include prioritizing the content being actively modified in the scan higher than the scan of the historical data. The historical data can be scanned via Application Programming Interfaces (APIs) associated with the SaaS application, and the notifications of the content being actively modified are via webhooks from the SaaS application.

The historical and live scanning process 850 can further include causing an action in the SaaS application based on the scan and based on policy and the content. The action can include any of allowing a file, deleting a file, quarantining a file, and providing a notification. The historical and live scanning process 850 can further include causing the execution of a file of the content in a sandbox for the identifying malware. The historical and live scanning process 850 can further include causing queueing of the content being actively modified and the historical data.

CASB In-Memory Data Store

As described herein, the CASB system 400, such as implemented via the cloud-based system 100, is configured to perform scans of data located in the SaaS providers 402. Again, the data can include files, email, etc., and the data can be accessed by the CASB system 400 via APIs. The scan is for security and/or DLP policy, configured by a tenant. As described herein, if there is a DLP violation and/or if a file/email contains malware, this is referred to as a CASB incident or simply an incident. The present disclosure provides logging and reporting for incidents (as opposed to entire scan results). For CASB incidents, a file in the SaaS provider 402 can be modified and rescanned again and again multiple times. The logging and reporting requirement for incidents are different from the regular weblog and firewall log where the previous transactions are immutable, while incidents change. The objective here is to provide tenant IT with the current snapshot of the incidents for analysis thereof. The CASB in-memory data store describes a highly scalable and efficient incident reporting approach for the latest snapshot for a scan (for each file and email). There is a single log line recorded for each file/email that was updated when that particular file/email was last scanned.

Figure 14:
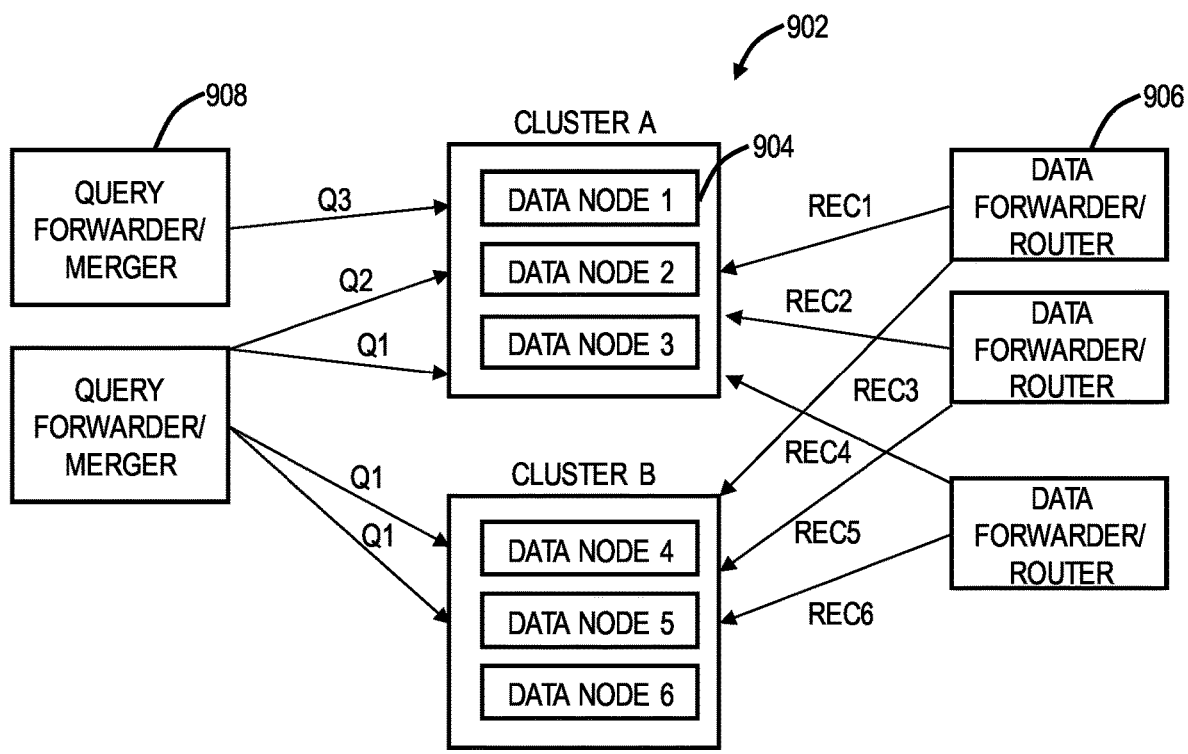
FIG. 14 is a block diagram of a CASB in-memory data store system.

FIG. 14 is a block diagram of a CASB in-memory data store system 900. The system 900 includes computing clusters 902 with various data nodes 904. The data nodes 904 are where the actual data store resides. A company (tenant) can reside in one or more clusters 902 at the same time. Also, a company can historically reside in one cluster 902 and migrate to another cluster 902 as part of load balancing for the clusters 902.

The CASB in-memory data store system 900 includes data forwarder/router nodes 906 and query forwarder/merger nodes 908. The data forwarder/router nodes 906 are configured to route logs, obtained during a scan with the CASB system 400 and based on an incident, to appropriate cluster 902. The data forwarder/router nodes 906 perform the routing function for incidents. Note, the data forwarder/router nodes 906 have intelligence, i.e., processing capability to receive a log and to determine which cluster 902 to forward it to. Note, the CASB system 400 can be multi-tenant, and the data forwarder/router nodes 906 know the topology for each tenant, and this is used to forward a particular log, such as based on metadata identifying a tenant, to the cluster or clusters for that particular tenant. Also, if a company (tenant) is spread across multiple clusters 902, the data forwarder/router nodes 906 can be configured to provide a log to all of the multiple clusters 902, such as via metadata. For example, in FIG. 14, assume there are two clusters 902 A and B, if a tenant is on both, the data forwarder/router nodes 906 attempt to distribute the log (record) equally among each cluster 902. In an embodiment, the receives the log for each incident from a worker 430 in the CASB system 400.

The query forwarder/merger nodes 908 are configured to receive queries from an external source and performs such queries through the data nodes 904. All requests (queries) land on query forwarder/merger nodes 908 and a node, based on a metadata of the tenant to cluster mapping, performs query planning, sends requests to clusters 902, and, if the query has been sent to multiple clusters 902, it will merge the results and send responses back to the client (requestor). Similar to the data forwarder/router nodes 906, the query forwarder/merger nodes 908 have the state to route the queries to a particular cluster 902, including multiple clusters 902 where a tenant is spread. Once the query forwarder/merger node 908 receives a response, it merges the results if there where multiple clusters 902, and sends the result back to the client.

Data Store Design and Data Structure

Figure 15:
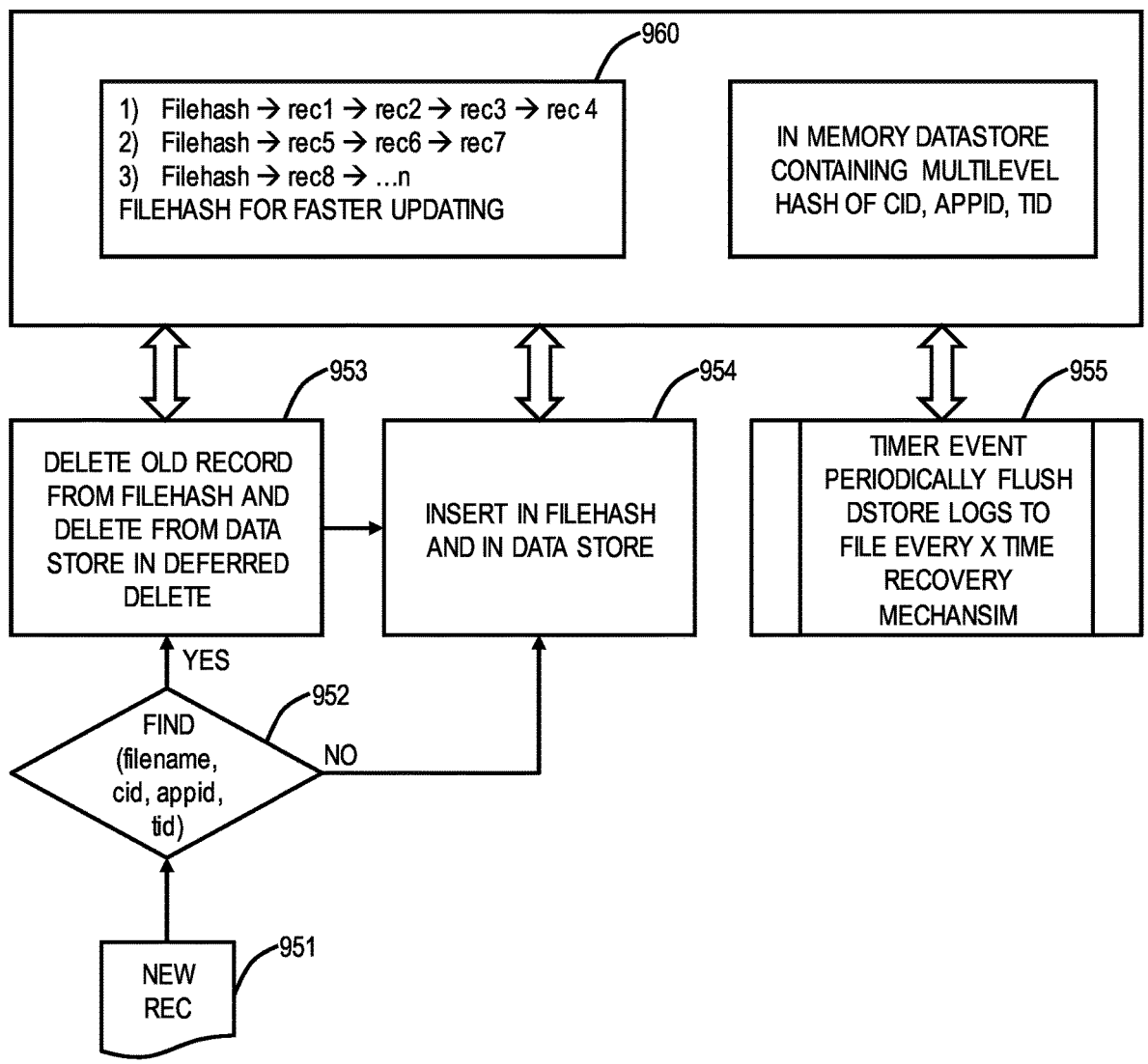
FIG. 15 is a flowchart of a record processing process implemented in the data store of the CASB in-memory data store system of FIG. 14.

The data store in the CASB in-memory data store system 900 supports various operations including an insert operation, a delete operation, an update operation, and a recovery mechanism to rebuild the data store in case of a service restart. FIG. 15 is a flowchart of a record processing process 950 implemented in the data store. The process 950 describes how update, delete, and insert operations are performed.

A new record is received (step 951). In case of any new record (step 951), the process 950 includes checking if entry exists in a filehash in a data store 960 (step 952). If so (step 952), it means the process 950 has seen that file earlier, and the old record is deleted from the filehash and deleted from the data store in a deferred delete, described herein (step 953). If the file does not exist in the filehash in the data store 960 or after the delete step 953, the record is inserted in the filehash in the data store 960 and in the data store (step 954). For a recovery mechanism, the process 950 can include periodically flushing the data store logs to a file (step 955). This can be every so often, based on a trigger event, etc.

The data store is mutable in-memory for highly-optimized updates and reports, for the most common dimensions of filtering, aggregation, and pagination. In the CASB system 400, the most common dimensions are application name (appname or application ID) and tenant name (i.e., the user 203). As such, all reports are around these dimensions.

Figure 16:
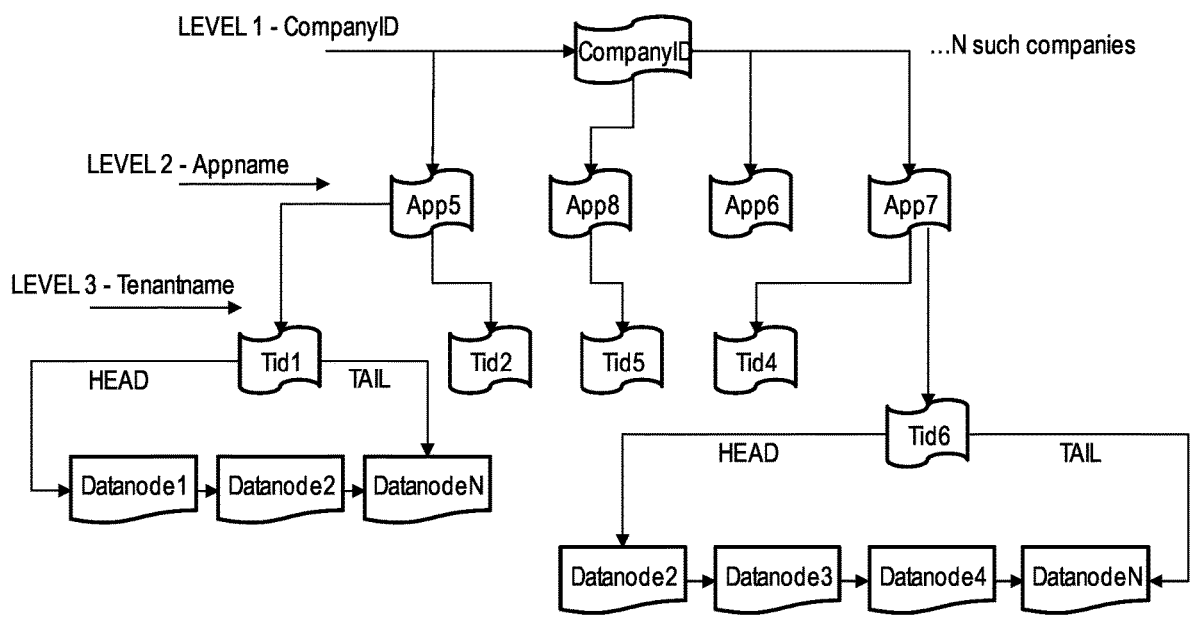
FIG. 16 is a diagram of an example implementation of the filehash from the data store of the CASB in-memory data store system of FIG. 14.

FIG. 16 is a diagram of an example implementation of the filehash in the data store 960. The filehash in the data store 960 is stored in the data store and can be a multilevel hash that includes a hash of a customer ID, application ID, tenantname ID, etc., where data is hashed by company, application name (appname or appid), and tenant name (tenantname or tid). At the leaf level, a list of actual records is stored. This data store will always contain the latest incident information for any file and for a particular combination of (appname, tenant, filename), only one entry is present, referred to as a datanode in FIG. 16.

Also, the following facts are noted and assumptions made. A file or email that is being scanned can belong to only one tenant (user), and a tenant can belong to one application. The maximum scan duration supported by the data store is for a certain period of time. Older scan results will be cleaned up periodically by the product. Most reports come with company, appname and tenant filters. Majority of the aggregation queries are on the filenames/email. So, the data store optimizes these reports.

The following provides pseudo code for the filehash in the data store 960:

```
1) New rec received
2) Check if already same file already exist for cid,appid, tid combination
In filehash
   filehash = smhashapi_keymd5_old(filenamep, filelength);
      head=&smslave_file_hash_table[(datanode-
>filehash)%SMSLAVE_FILEHASH_SIZE] ;
   _TAILQ_FOREACH(entry, head, filehash_entry) {
      If (cid, appid and tid matches)
      /* delete old record if it is not referenced both from this table as well as from
      inmemory
      /* data store
      }
3)  #define PREPARE_KEYREC(_cid, _appcat, _appid, _tid)
   keys[keycnt++]._u_int =_cid;
   keys[keycnt++]._enum = _appid;
   keys[keycnt++]._u_int = _tid;\
This will be used to find or insert record at which leaf node that is to be put in the in-
memory data store
4) Find leaf node for zks_prefix_tree_schema_get(ctx->ptp_dstore, keys) for keys
prepare in step (3)
This will give us the head of list where actual complete record is stored.
5)  _TAILQ_INSERT_HEAD(head, datanode, comp_list_entry
This will make sure records are stored in descending order of time.
```

Data Duplication Prevention

In the CASB in-memory data store system 900, data is distributed across the nodes 904 in clusters 902 based on some hash functions (e.g., key % noOfnodes) and records based on some key that can also be updated/deleted in mutable systems. But when any node 904 is added or deleted, the hash function can give different nodes for a key which was earlier sent to node A and later the hash function sends to another node B leading to multiple copies of the same mutable record being on different nodes 904, leading to inconsistency in data. This scenario can occur when a company moves from one cluster to another cluster as part of the load balancing.

Figure 17:
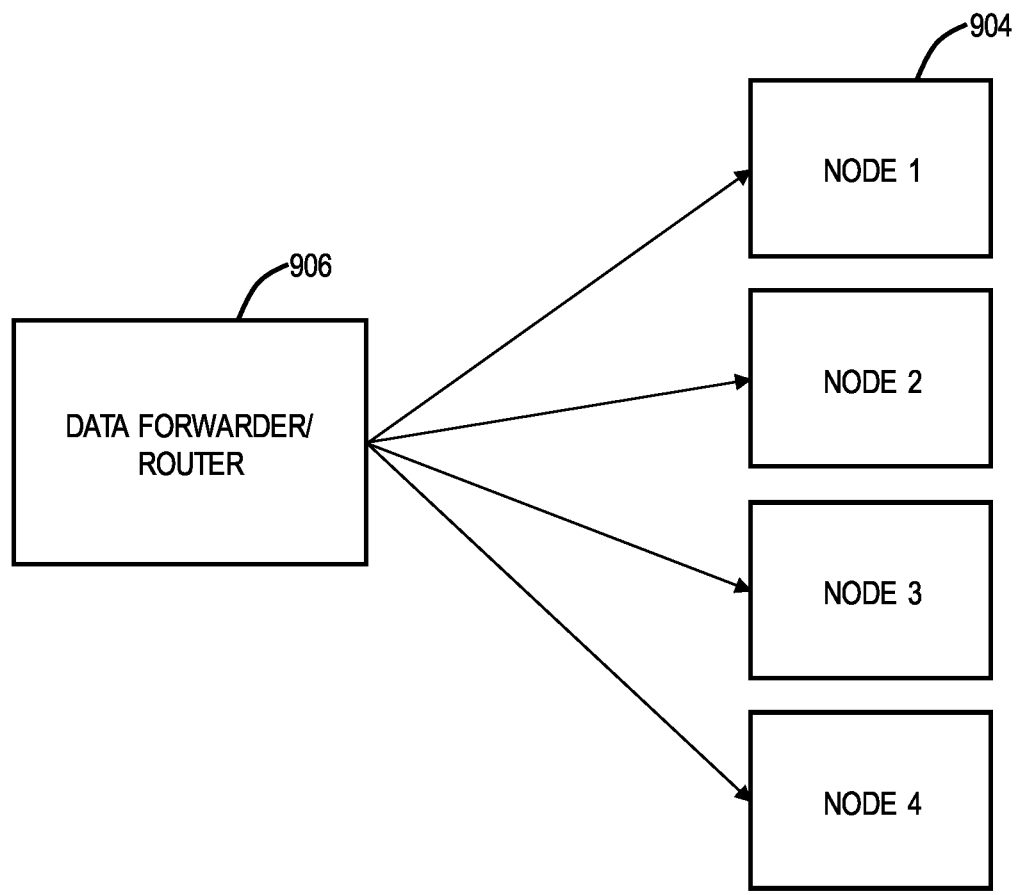
FIG. 17 is a diagram of data duplication prevention in the data store.

FIG. 17 is a diagram of data duplication prevention in the data store. To make sure that the only one record of a key lies across all the nodes 904 in a cluster 902, whenever any node addition happens, a broadcast is sent to delete that key to all of the nodes 904 in the cluster 902 except the current node which the hash function distributes to. In that way, all nodes 904 which have an old record of same key will delete their record and only one node will have the record.

Suppose in the CASB in-memory data store system 900, there is data with a key as FILEID distributed uniquely among 3 nodes (Node 1, 2, 3). FileId 4 belongs to Node 2. Now, Node 4 is added and due to this, the data forwarder forward it do Node 4 leading to multiple copies of FILEID 4. During this time, the data forwarder/router node 906 detects that node addition has been done in last X days and there can be chances that this data might be lying on other nodes, the data forwarder/router node 906 sends a DELETE record of that key (in this case FILEID 4) to all other nodes which might be having this older record and each node manager handles the delete record in Deferred delete way which is covered next.

Deferred Delete on Data Manager

Data managers cannot delete a record blindly without checking a reference for that record otherwise it will show inconsistent record when query/report runs. A deferred delete includes, suppose a query is running and referencing the data store, and a delete record is received where a query is also running. The data manager checks if the record is referred by a query manager, and if yes, puts that record into a deferred list and marks it a soft delete. Whenever the reference of that record becomes zero, the data manager deletes that record.

For insertion, it is checked from another file-based hash whether an entry is already there in the data store, and, if yes, delete that record using the deferred delete operation and insert the new one. Insertion is fast as the process just needs to find a particular tenant hash bucket and insert at the head.

Benefits of Maintaining a Unique Key Across Nodes

In distributed query engines, most of the expensive queries are related to count distinct queries on high cardinality fields with aggregates. Consider the use case for the following query:

"from CASB select count(distinct filename) where companyid=1 group by appname, tenantid"

The above query is an expensive query as it needs to maintain the list of all files in memory to resolve duplicates and count the filenames after all data has been read. Due to the nature of the data store (multi-level hash), this complex count distinct query on unique keys can be converted into a normal count query leading to faster response time. Thus, the query is converted to "from casb select count(1) as unique files where cid=1 group by appname, tid"

Instead of maintaining the entries for each file, it just needs to read and count the rows as duplicates are removed at the time of record update.

Reporting Design and Optimizations

A query request can come to query forwarder/merger node 908 for following kind of companies:

a) Company which is not distributed across multiple clusters 902. In this case, requests need to be processed from an in-memory data store lying on a single data node and the node 908 acts as a forwarder for these kinds of queries.

b) Company which is distributed among multiple clusters 902. In this case, requests need to be processed from many in-memory data store lying on different clusters 902 and the node 908 acts as query planner and merger for these kinds of queries.

For all these requests, optimized filtering and aggregation operations are needed to have faster response time and reduce the resource utilization.

Filtering

The most common reports require filters on appname and tenant name. The data store is maintained such that if any such filter comes, it is possible to apply filtering at the hash level instead of reading all records. This will be applied at the hash level and once level filtering is passed, data can be directly passed to the consumer without applying the same filter again and again on each record.

Advantageously, a chain of records is filtered by applying a filter at level of in memory data store 960 skipping filter check for each record. This technique of using in-memory data store 960 for filtering can be done for other use cases.

Inbuilt Cache for Popular Reports (Group by Appname, Tenantname)

The data is stored in a multi-level hash (FIG. 16) that includes company, application and tenant nodes. These nodes are the parent to underlying child nodes that contain the incident scan results. These nodes can work as a cache to store the summary of the underlying logs. For example, each application node can store the following information:

i) Count of malware incidents in the underlying nodes, e.g., from CASB select count (transactions) where malware >0 where appname=BOX group by tenant;

ii) Count of DLP violation, e.g., from CASB select count (transactions) where DLP>0 group by appname, and iii) number of files in the tenant.

The count on the parent nodes are updated when a new incident is added/modified in the data store 960. The data update operation will be negligible because each file belongs to only one <company, appname, tenant> combination.

Since the data store 960 supports the scan reports for the last X days (e.g., 90 days), the parent nodes can store the counts for each separate day by maintaining X buckets. All the reports starting with day boundary time can be served from the parent node cache.

Pagination for Aggregate Reports

In a distributed data system, running aggregation based queries on high cardinality fields can be very expensive. For example, from CASB select count (distinct filename) as trans group by ownername limit 25 offset 0. Here, the filename can have high cardinality in the range of millions, the ownername can have medium cardinality in range of 100's of thousand, and, in this query, a user wants to see 25 aggregated records.

The query forwarder/merger node 908 can send this query to all the individual data nodes 904, which can each have a query manager, and the query manager processes the query as follows:

1) start reading data and create hash based on ownername column;

2) for each hash bucket (unique ownername values), maintain unique distinct filename values; and 3) once data read is finished, take 25 bucket and count unique A values and send results.

In this approach, even if the query forwarder/merger node 908 asks for 25 aggregate records, the query processor is processing all 100k unique B entries and maintaining a hash for all the buckets leading to query slowness. Also, the hash lookup for all the values of aggregating column which will be processor intensive and maintaining hash for all the values of aggregating column will take too much memory.

To solve this issue, the query forwarder/merger node 908 forwards the request to each query processor on each node 904 and asks for 25 records from each query processor. The query processor maintains a hash for 25 entries instead of maintaining a hash for all the 100K unique entries The query processor maintains metadata of the aggregated column which it has seen previously. The metadata is used to skip previous run response entries which the query processor has already sent. When this request is received the first time with offset 0, the metadata will be empty. The following steps for the first run are as follows:

a) start reading data and create hash based on ownername column.

b) once a hash contains 25 unique entries (limit count), the query manager creates a filter with these values and starts dropping entries for the rest of (100k–25) entries instead of maintaining hash and doing lookup. This will help in reducing memory footprint and query faster.

c) once the query is finished on the query node, each query node will send its result to the query forwarder node 908 and each query processor on that node maintains metadata of these unique entries for the next pagination request if it comes.

The steps for the second run where a client requests the next 25 records:

a) the query processor starts reading data and puts the entry into the hashtable only if it does not belong to metadata entries (previous run response unique entries);

b) now when a hashtable contains unique 25 entries, the query manager creates a filter with these values and starts dropping entries for the rest of entries instead of maintaining hash and doing lookup;

c) once the query is finished on the query node, each query node will send its result to the query forwarder and each query processor on that node updates metadata of these unique entries for the next pagination request if it comes; and d) now metadata will have 50 entries (25 for 1st run and 25 for 2nd run).

The same can continue for the next pagination request.

Advantageously, this reduces the memory footprint for the query engine as there is no need of doing aggregation for all the values of a dimension, and the response time will be faster.

For queries spanning multiple in-memory data store nodes 904, the query forwarder/merger node 908 will merge the results and return the result to the client. For a single in-memory data store, the query forwarder/merger node 908 will forward the result to the client.

Stateless Query Execution Engine with Cached Support

For all expensive queries, the results can be cached after the query execution. The cache could be used by the subsequent queries in the following cases:

i) a similar query is received from another user and the cached results can be served directly to the client.

ii) The cached data structure can be further processed to produce the report. In this case, the query will be faster as it will be working on a subset of data rather than a complete data store.

For example, suppose the first query is

"from CASB select count(distinct filenames) group by appname, tid"

In this, once the query is finished, the results are sent and saved in cache with an Abstract Syntax Tree (AST) acting as metadata for query matching.

For example, suppose a second query is

"from CASB select count(distinct filenames) where appname=BOX group by tid"

Once the query is parsed, the query engine will try to check based on incoming Query AST (Abstract Syntax Tree) by matching it previous query AST's and see if it matches. In this example, group by clause AST match, cache contains appname and tid and the query contains tid only so this query can be run as subset of original query.

If the select clause also matches, where the clause of the 2nd query is also a subset of original query as original query contains data for everything and also appname field in where clause is present in group by AST of cache query (appname). In this case, the query will be faster because it is not reading all the data, it is just reading the aggregate results and from there deriving response for this query result.

For example, suppose a third query is

"from CASB select count(distinct filenames) where ownername like (\"abhishek\") group by tid"

Here, the group by AST is subset of group by AST of query cache (query 1), the select clause AST is subset of select AST of query cache (query 1), and the where clause AST does not match cache AST because ownername field is not there in group by AST, select by AST of cache AST.

Algorithm a) if a filter matches multilevel keys (appname or tid), it converts it into level filter;

b) if it is a count distinct query on a unique key with a group by multilevel keys convert it into a normal count query.

For example "from CASB select count (distinct filename) group by appname, tid," this can be converted to from CASB select count(filename) group by appname, tid.

c) count based queries multi-level hash keys can be served from node count metrics instead of walking through multilevel hash leaf entries. In this, the query engine producer will be just passing the level key and metrics to consumer instead of passing each record.

Sample Queries from casb_fileapps select count(distinct filename) as tot_dlpincidents where appname=BOX and ANY(dlpdictids)!=0"→output: tot_dlpincidents=34.

from casb_fileapps select count(distinct filename) as unique_fileincidents, id2name(ownerid) as ownername group by userid ownerid limit 100"→output ownerid, unique_fileincidents,ownername, 65761,130,traffic_loc→other, 65786,1,ca_loc.

from casb_fileapps select time as time, filename as filename, appname as appname id2name(tid) as tenantname, dlpdictids where ANY(dlpdictids)!=0 limit 2"→output 1594175160, one.txt, BOX, ca_loc, [61, 62], 1594167110, casb_test.txt, GDRIVE, g_tenant, [1,3].

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method performed by a Cloud Access Security Broker (CASB) service, the method comprising steps of:

scanning data stored in one of a cloud provider and a Software-as-a-Service (SaaS) application, wherein the data is for a user associated with a company of a plurality of companies;

detecting an incident in a file or email in the data during the scanning;

maintaining details of the incident in an in-memory data store, including a current snapshot of the file or email; and providing a notification to the tenant of the incident.

2. The method of claim 1, wherein the steps further include:

subsequent to the incident and while the file or email is being updated, updating the details of the incident in the in-memory data store.

3. The method of claim 1, wherein the incident is one of a Data Loss or Leakage Prevention (DLP) violation and malware.

4. The method of claim 1, wherein the steps further include:
 periodically storing records in the in-memory data store in a file for recovery.

5. The method of claim 1, wherein the in-memory data store includes a multi-level hash for a record, for the incident.

6. The method of claim 5, wherein the maintaining includes performing any of inserting, deleting, and updating the record, for the incident.

7. The method of claim 5, wherein the multi-level hash include at least a hash based on the company and a hash based on an application name.

8. A non-transitory computer-readable medium comprising instructions that, when executed, cause one or more processors to implement a Cloud Access Security Broker (CASB) service, the CASB service comprising steps of:
 scanning data stored in one of a cloud provider and a Software-as-a-Service (SaaS) application, wherein the data is for a user associated with a company of a plurality of companies;
 detecting an incident in a file or email in the data during the scanning;
 maintaining details of the incident in an in-memory data store, including a current snapshot of the file or email; and
 providing a notification to the tenant of the incident.

9. The non-transitory computer-readable medium of claim 8, wherein the steps further include:
 subsequent to the incident and while the file or email is being updated, updating the details of the incident in the in-memory data store.

10. The non-transitory computer-readable medium of claim 8, wherein the incident is one of a Data Loss or Leakage Prevention (DLP) violation and malware.

11. The non-transitory computer-readable medium of claim 8, wherein the steps further include:
 periodically storing records in the in-memory data store in a file for recovery.

12. The non-transitory computer-readable medium of claim 8, wherein the in-memory data store includes a multi-level hash for a record, for the incident.

13. The non-transitory computer-readable medium of claim 12, wherein the maintaining includes performing any of inserting, deleting, and updating the record, for the incident.

14. The non-transitory computer-readable medium of claim 12, wherein the multi-level hash include at least a hash based on the company and a hash based on an application name.

15. A cloud-based system comprising:
 a plurality of nodes communicatively coupled to one another, wherein the plurality of nodes include one or more processors configured to implement a Cloud Access Security Broker (CASB) service, where one or more nodes are configured to
 scan data stored in one of a cloud provider and a Software-as-a-Service (SaaS) application, wherein the data is for a user associated with a company of a plurality of companies;
 detect an incident in a file or email in the data during the scanning;
 maintain details of the incident in an in-memory data store, including a current snapshot of the file or email; and
 provide a notification to the tenant of the incident.

16. The cloud-based system of claim 15, wherein one or more nodes are further configured to:
 subsequent to the incident and while the file or email is being updated, update the details of the incident in the in-memory data store.

17. The cloud-based system of claim 15, wherein the incident is one of a Data Loss or Leakage Prevention (DLP) violation and malware.

18. The cloud-based system of claim 15, wherein one or more nodes are further configured to:
 periodically storing records in the in-memory data store in a file for recovery.

19. The cloud-based system of claim 15, wherein the in-memory data store includes a multi-level hash for a record, for the incident.

20. The cloud-based system of claim 19, wherein the maintaining includes performing any of inserting, deleting, and updating the record, for the incident.

\* \* \* \* \*